(12) United States Patent  (10) Patent No.: US 8,427,664 B2
Iijima  (45) Date of Patent: Apr. 23, 2013

(54) KEY BASED ELECTRONIC FILE APPROVAL MANAGEMENT SYSTEM

(75) Inventor: Osamu Iijima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1082 days.

(21) Appl. No.: 12/237,684

(22) Filed: Sep. 25, 2008

(65) Prior Publication Data

US 2009/0097059 A1  Apr. 16, 2009

(30) Foreign Application Priority Data

Sep. 27, 2007  (JP) ................................ 2007-252083

(51) Int. Cl.
*G06F 3/12*  (2006.01)

(52) U.S. Cl.
USPC ......... 358/1.14; 358/3.28; 707/690; 707/698; 713/100; 713/176

(58) Field of Classification Search ............... 358/1.14, 358/3.28; 707/690, 698; 713/100, 176
See application file for complete search history.

(56) References Cited

U.S. PATENT DOCUMENTS

| | | | |
|---|---|---|---|
| 5,604,800 A * | 2/1997 | Johnson et al. | 713/189 |
| 6,396,594 B1 * | 5/2002 | French et al. | 358/1.18 |
| 7,904,732 B2 * | 3/2011 | Cui et al. | 713/193 |
| 2003/0014368 A1 * | 1/2003 | Leurig et al. | 705/64 |
| 2009/0031142 A1 * | 1/2009 | Halevi et al. | 713/190 |

FOREIGN PATENT DOCUMENTS

JP  2005-165844 A  6/2005

* cited by examiner

*Primary Examiner* — David K Moore
*Assistant Examiner* — Peter K Huntsinger
(74) *Attorney, Agent, or Firm* — Panitch Schwarze Belisario & Nadel LLP

(57) ABSTRACT

An electronic file approval management system includes information terminal devices for a creator creating an electronic file and for an approver approving the file. The device for approver includes an electronic information transmitter-receiver storing and retrieving information with the device for creator, an input unit being input an approval result, a first print data converter converting the file into first print data, a first approval information extractor extracting first approval information, and a key creation unit creating an approval key. The device for creator includes a creation unit creating the electronic file, an electronic information transmitter-receiver for the creator storing and retrieving information with the device for approver, a second print data converter converting the file into second print data, a second approval information extractor extracting second approval information, and an approval key authentication unit determining whether to approve based on collation of the second approval information and approval key.

11 Claims, 19 Drawing Sheets

KEY BASED ELECTRONIC FILE APPROVAL MANAGEMENT SYSTEM

BACKGROUND OF THE INVENTION

1. Field of the Invention

The present invention relates to an electronic file approval management system for managing an approval process of an electronic document.

2. Description of Related Art

In a prior art approval process method of an electronic document (hereafter referred to as a document), a creator of the document prints the document using a printer, and an approver confirms the printed document and impress a stamp. In such a method, when the printed document has a problem such as misdescription, the printed document is returned to the creator, is reedited and is reprinted, causing a problem of wasting the printed document being already confirmed, etc.

Japanese Un-examined Patent Application Publication No. 2005-165844 discloses an authentication/approval system as a method for solving such a problem described above by a document print system having a client apparatus and a printer connected through an information communication network such as a network. The client apparatus adds print control information having restriction information of document print and instruction information for printing a predetermined image to document data and transmits to the printer, and the printer prints the document according to the control information and the predetermined image according to the instruction information based on the print control information and document data transmitted from the client apparatus.

In such a prior art technique, however, a special printer or an authentication server recognizing the print control information of the document to be printed by the document creator is needed to be provided beforehand. In addition, such a printer or an authentication server needs to register collation information of the document as database beforehand so as to collate the print control information, resulting in a difficulty of adopting such a prior art technique in terms of cost and environment.

Therefore, it is an object of the present invention to provide an electronic file approval management system capable of reducing an unnecessary printed matter when the electronic file is returned to the creator during the approval process of the document by the approver, and not requiring a special device or an authentication server for executing the approval process. Moreover, the electronic file approval management system is capable of completing the approval process without labor of impressing a stamp by the approver on the document printed by the creator in the approval process of the document.

BRIEF SUMMARY OF THE INVENTION

According to one aspect of the invention, an electronic file approval management system includes: an information terminal device for an electronic file creator creating an electronic file; and an information terminal device for an approver approving the electronic file. The information terminal device for the approver includes: an electronic information transmission reception unit for the approver storing and retrieving electronic information with the information terminal device for the electronic file creator; an input unit for approving the electronic file being input an approval result by a user of the electronic file received by the electronic information transmission reception unit; a first print data conversion unit converting the electronic file into first print data based on the approval result input to the input unit for approving the electronic file; a first approval information extraction unit extracting first approval information of the electronic file based on the first print data converted by the first print data conversion unit; and an approval key creation unit creating an approval key based on the first approval information extracted by the first approval information extraction unit. The information terminal device for the electronic file creator includes: an electronic file creation unit creating the electronic file; an electronic information transmission reception unit for the electronic file creator storing and retrieving the electronic information with the information terminal device for the approver; a second print data conversion unit converting the electronic file into second print data; a second approval information extraction unit extracting second approval information of the electronic file based on the second print data converted by the second print data conversion unit; and an approval key authentication unit determining whether or not to make an approval based on collation of the second approval information extracted by the second approval information extraction unit and the approval key transmitted from the electronic information transmission reception unit for the approver.

According to another aspect of the present invention, an information terminal device for an approver includes: an electronic information transmission reception unit for the approver storing and retrieving electronic information with an electronic information device for an electronic file creator; an input unit for approving an electronic file being input an approval result of the electronic file received by the electronic information transmission reception unit for the approver; a print data conversion unit converting the electronic file into print data based on the approval result input to the input unit for approving the electronic file; an approval information extraction unit extracting approval information of the electronic file based on the print data converted by the print data conversion unit; and an approval key creation unit creating an approval key based on the approval information extracted by the approval information extraction unit.

According to still another aspect of the present invention, an information terminal device for an electronic file creator includes: an electronic file creation unit creating an electronic file; a print data conversion unit converting the electronic file into print data; an approval information extraction unit extracting approval information of the electronic file based on the print data converted by the print data conversion unit; an electronic information transmission reception unit for the electronic file creator storing and retrieving electronic information including an approval key with an information terminal device for an approver; and an approval key authentication unit determining whether or not to make an approval based on collation of the approval information extracted by the approval information extraction unit and the approval key received by the electronic information transmission reception unit for the electronic file creator.

Another aspect of the present invention provides a method of managing an electronic file approval applied to an electronic file approval management system including an information terminal device for an electronic file creator creating an electronic file and an information terminal device for an approver approving the electronic file, the method involving: creating the electronic file by an electronic file creation unit; transmitting the electronic file created by the electronic file creation unit to the information terminal device for the approver; receiving the electronic file transmitted by the transmitting step of transmitting the electronic file; inputting an approval result of the electronic file received by the receiving step into an input unit for approving the electronic file; converting the electronic file into first print data based on the approval result input to the input unit for the approving the electronic file; extracting first approval information of the electronic file based on the first print data; creating an approval key based on the first approval information; transmitting the approval key to the information terminal device for the electronic file creator; receiving the approval key transmitted by the transmitting step of transmitting the approval key; converting the electronic file into second print data; extracting second approval information of the electronic file based on the second print data; and determining whether or not to make an approval based on collation of the second approval information and the approval key received by the receiving step of receiving the approval key.

Additional features and advantages of the present invention will be more fully apparent from the following detailed description of embodiments, the accompanying drawings and the associated claims.

BRIEF DESCRIPTION OF THE DRAWINGS

A more complete appreciation of the aspects of the invention and many of the attendant advantage thereof will be readily obtained as the same becomes better understood by reference to the following detailed description when considered in connection with the accompanying drawings, wherein.

DETAILED DESCRIPTION OF PREFERRED EMBODIMENTS

Figure 1:
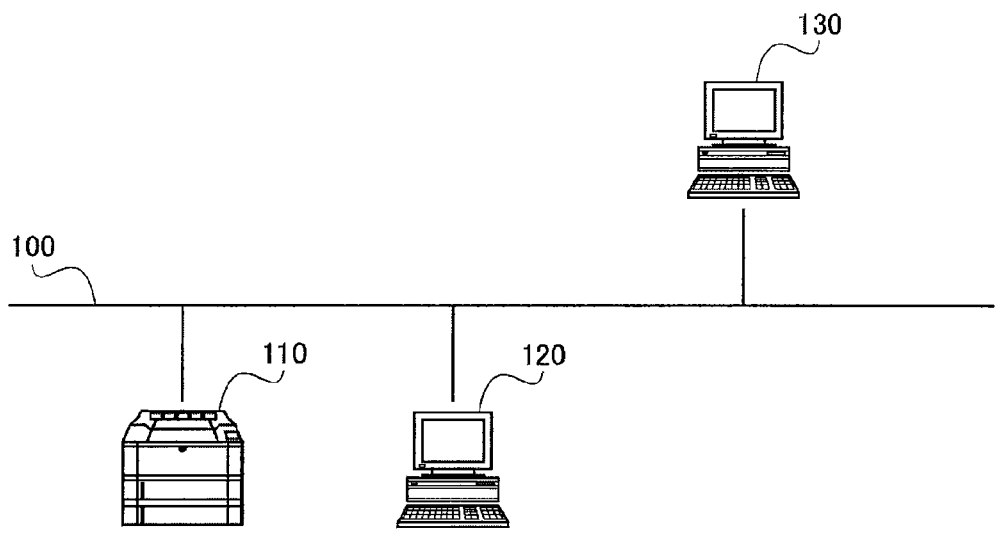
FIG. 1 is a schematic diagram illustrating an electronic file approval management system according to a first embodiment of the present invention.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Reference is now made to the drawings, wherein like reference numerals designate identical or corresponding parts throughout the several views.

A First Embodiment

Referring to FIG. 1, an electronic file approval management system according a first embodiment of the present invention is illustrated. The electronic file approval management system includes a network 100 such as a local area network (LAN) operated in an office, a network printer 110 that prints an electronic file, a personal computer 120 that is an information terminal device for an approver approving the electronic file, and a personal computer 130 that is as an information terminal device for a creator creating the electronic file.

Figure 2:
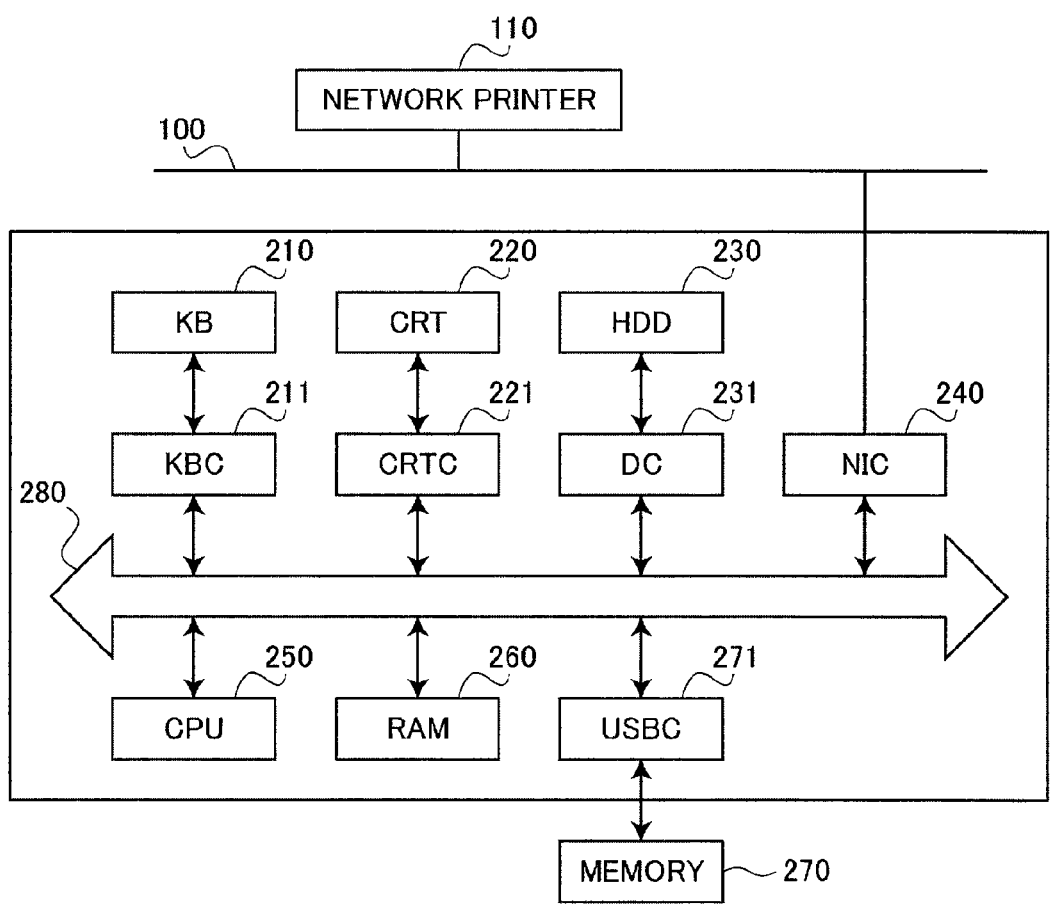
FIG. 2 is a block diagram illustrating physical arrangements of the personal computers included in the electronic file approval management system of FIG. 1.

Referring to FIG. 2, physical arrangements of the personal computers 120 and 130 are illustrated in a block diagram. The personal computers 120 and 130 include a keyboard (KB) 210, a keyboard controller (KBC) 211, a cathode ray tube (CRT) display 220, a CRT controller (CRTC) 221, a hard disk drive (HDD) 230, a disk controller (DC) 231, a network interface card (NIC) 240, a central processing unit (CPU) 250, a random access memory (RAM) 260, a memory 270, a universal serial bus controller (USBC) 271, and a system bus 280.

The keyboard controller 211 transmits an instruction input from the keyboard 210. The CRT controller 221 controls a display content of the CRT display 220. The disk controller 231 controls an access with the HDD 230 storing a printer driver according to the first embodiment of the present invention. Each of the network interface cards 240 serving as electronic information transmission reception units for the electronic file creator and the approver controls bi-directional data communication performed through the network 100. The PAM 260 functions as, for example, a main memory of the CPU 250 and a work area. The UBS controller 271 controls an access of bi-directional data communication between each of the personal computers 120 and 130 and the memory 270 of an external memory device. Each of the devices is connected to the system bus 280 as illustrated in FIG. 2.

The CPU 250 serving as a central arithmetic processing device executes the printer driver stored in the HDD 230 and controls each of the devices connected to the system bus 280 based on a process command of the executed printer driver.

Figure 3:
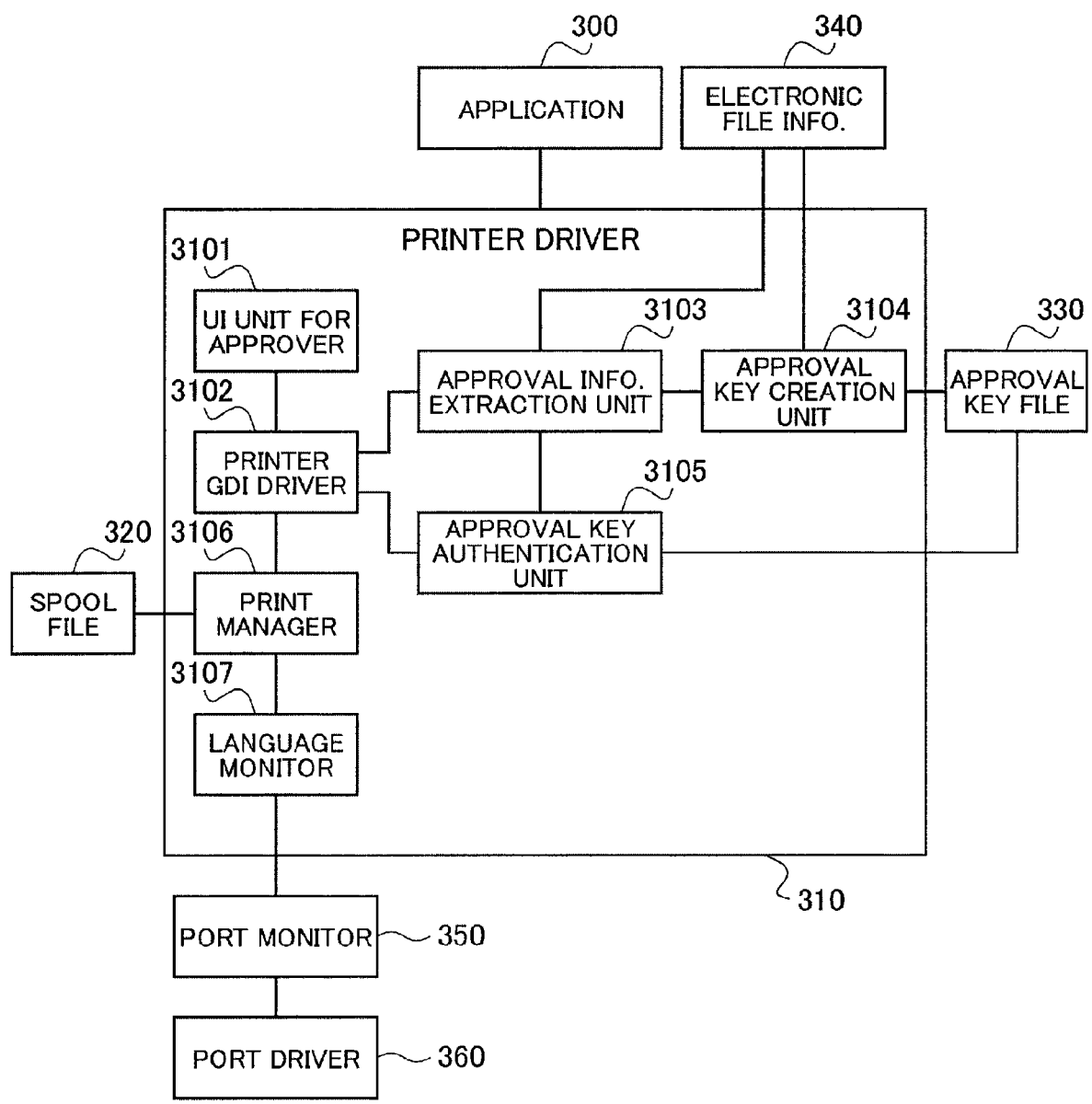
FIG. 3 is a block diagram illustrating modules of the personal computer used by an approver according to the first embodiment of the present invention.

Referring to FIG. 3, modules of the personal computer 120 used by the approver are illustrated in a block diagram. The personal computer 120 includes an application 300, a printer driver 310, a spool file 320, an approval key file 330, electronic file information 340, a port monitor 350, and a port driver 360.

The printer driver 310 includes a user interface (UI) unit 3101 for the approver, a printer graphic device interface (GDI) driver 3102, an approval information extraction unit 3103, an approval key creation unit 3104, an approval key authentication unit 3105, a print manager 3106, and a language monitor 3107.

The application 300 serving as an application program operated in the personal computer 120 is a general software program that executes creating, editing, storing and printing, etc. the electronic file. The electronic file created by the application 300 includes information to be printed in a recording medium such as a sheet in a course of printing and attribute information of the application such as a name of an application program creating the electronic file, a name of the electronic file, electronic file creator information, and creation date and time of the electronic file. Print data (described later) includes such attribute information in addition to information to be actually printed on the recording medium.

The printer driver 310 is a generic name for a program from receiving a print instruction from the application 300 to outputting the print data.

The spool file 320 serving as spool data of the print data created by the printer GDI driver 3102 is temporarily managed in the HDD 230 by the print manager 3103.

The approval key file 330 serving as electronic information is used for file authentication by the approval key authentication unit 3105.

The electronic file information 340 serving as approval information of the electronic file includes the attribute information of the application 300 such as a name of an application creating the electronic file, a name of the electronic file, a name of the electronic file creator, and creation date and time of the electronic file based on the print data created by the printer GDI driver 3102.

The port monitor 350 serving as a program executes a port management so as to deliver the data to the network printer 110 through the port driver 360 in response to a control request from the language monitor 3107.

The port driver 360 serving as a program controls transmission and reception of the data by directly controlling the network interface card 240.

The user interface unit 3101 for the approver serving as an input unit for approving the electronic file is an input interface of the printer driver 310, and is a program executed by the CPU 250 when a print command is provided from the application 300. The user interface unit 3101 for the approver serving as an interface displays a print setting content of the network printer 110 on the CDT display 220 and receives a general print setting input of the network printer 110 from the keyboard 210. Moreover, the user interface unit 3101 for the approver serving as an interface for creating an approval key file (described later) and as an interface for reading the approval key file in addition to serving as the print setting input interface. The user interface unit 3101 for the approver will be described in detail with reference to FIGS. 5A through 5c.

The printer GDI driver 3102 serving as a print data conversion unit is a program that is dedicated to the network printer 110 and creates the print data from the electronic file based on the print setting content input by the user interface unit 3101 for the approver.

The approval information extraction unit 3103 serving as a program extracts the electronic file information 340 from the print data created by the printer GDI driver 3102. The extracted electronic file information 340 is temporarily stored in the RAM 260.

The approval key creation unit 3104 serving as a program creates the approval key file 330 based on the electronic file information 340, and encrypts the approval key file 330 by a general encrypted secret key algorithm such as a Data Encryption Standard (DES).

The approval key authentication unit 3105 serving as a program decrypts the approval key file 330 and collates the decrypted approval key file 330 with the electronic file information 340 extracted from the print data by the approval information extraction unit 3103 so as to determine whether or not a restricted print such as a watermark exists.

The print manager 3106 serving as a program spools the print data crated by the printer GDI driver 3102 by an amount of the document and manages the spool file 320.

The language monitor 3107 serving as a program controls bi-directional communication with the network printer 110 and the printing of the printer.

Figure 4:
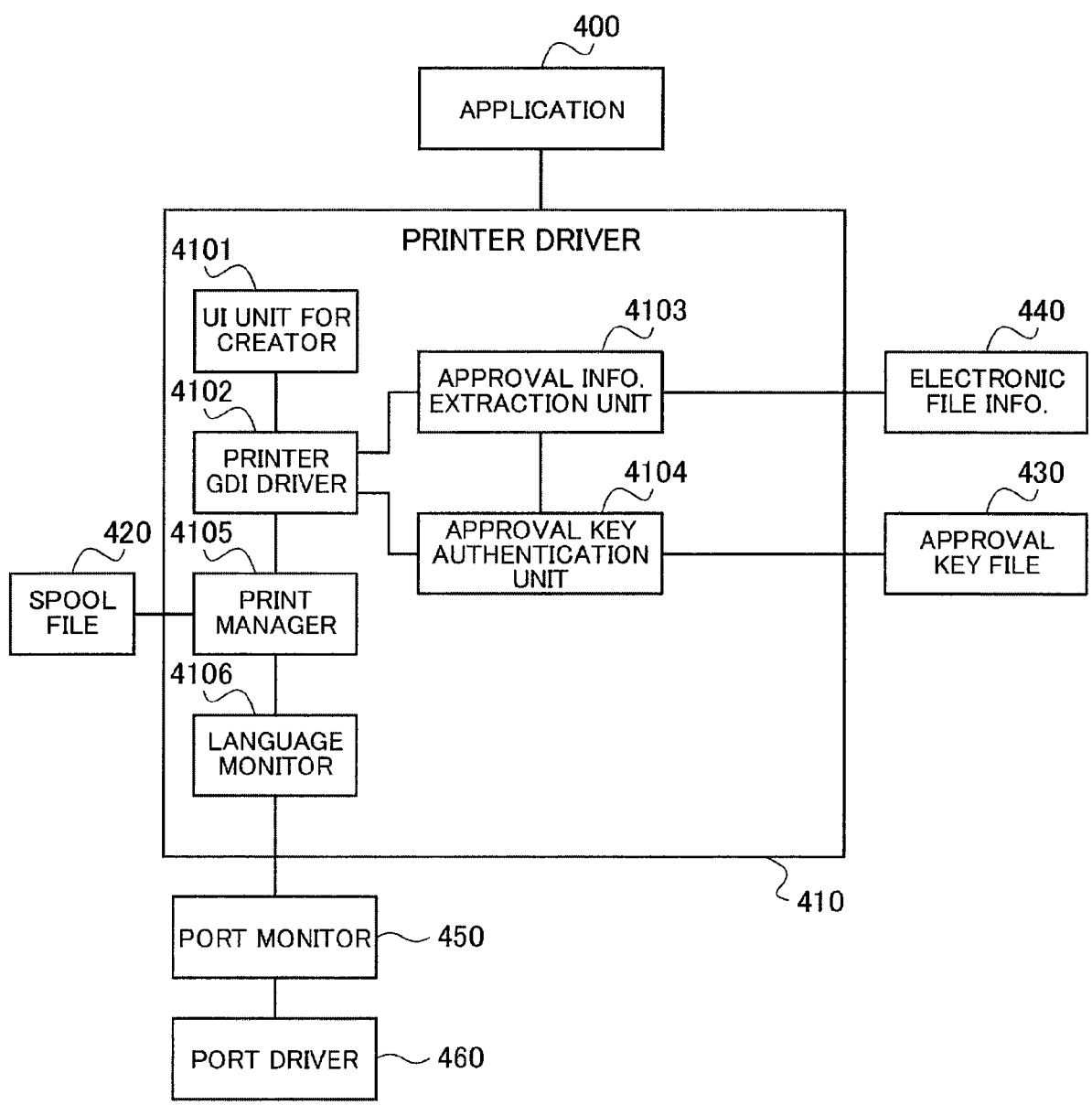
FIG. 4 is a block diagram illustrating modules of another personal computer used by a creator according to the first embodiment of the present invention.

Referring to FIG. 4, modules of the personal computer 130 used by the creator are illustrated in a block diagram. The personal computer 130 includes an application 400 serving as an electronic file creation unit, a printer driver 410, a spool file 420, an approval key file 430, electronic file information 440, a port monitor 450 and a port driver 460. Since the modules of the personal computer 130 are similar to those of the personal computer 120, the description of each of the elements is omitted.

The printer driver 410 includes a user interface (UI) unit 4101 for the creator, a printer graphic device interface (GDI) driver 4102, an approval information extraction unit 4103, an approval key authentication unit 4104, a print manager 4105 and a language monitor 4106.

Figure 5A:
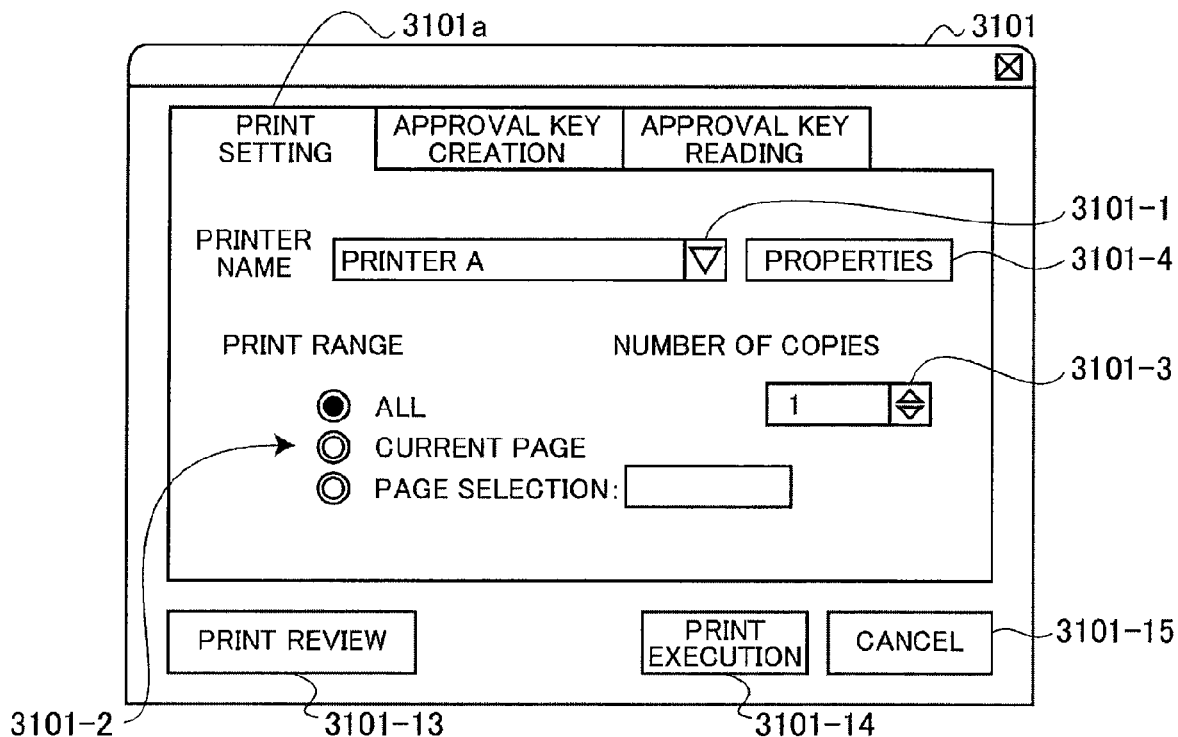
FIGS. 5A though 5C are schematic diagrams illustrating a user interface unit for the approver in the personal computer used by the approver according to the first embodiment of the present invention.
Figure 5B:
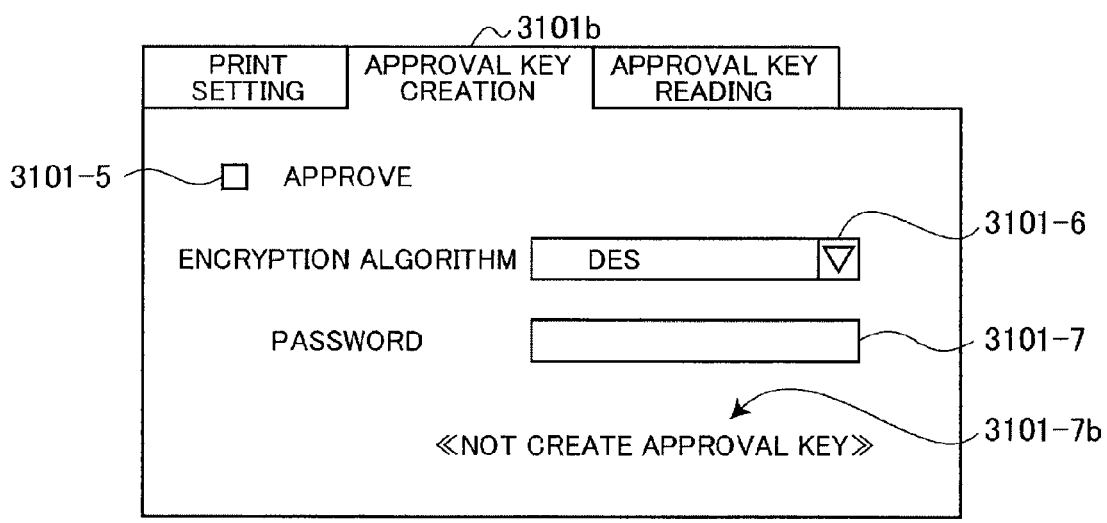
Figure 5C:
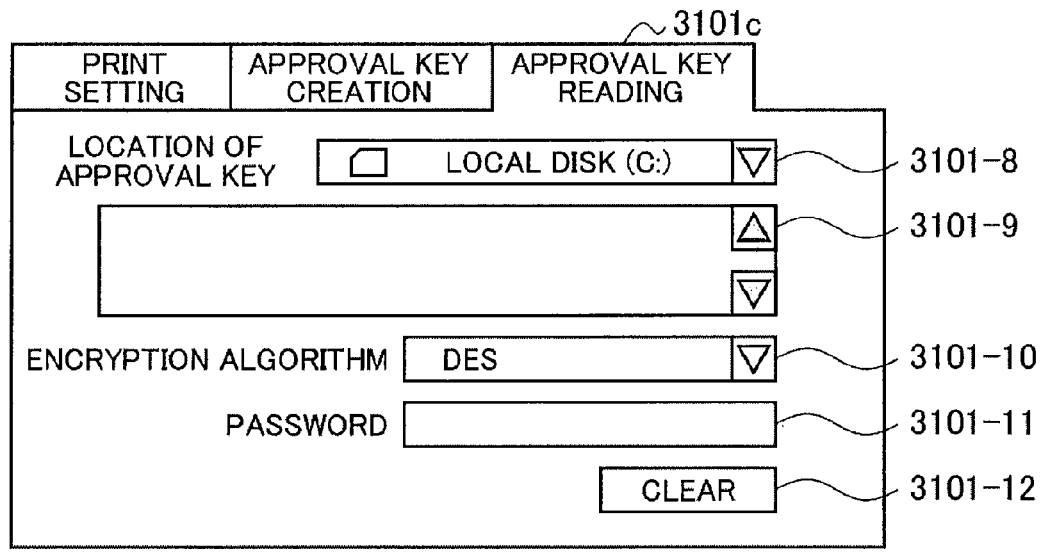

Referring to FIGS. 5A through 5C, examples of the user interface unit 3101 for the approver of the personal computer 120 are illustrated. The user interface unit 3103 for the user includes a print setting input interface 3101a, an approval key creation interface 3101b and an approval key reading interface 3101c, and is switchable to the different interfaces by selecting a tab. Examples of input screens of the print setting input interface 3101a, the approval key creation interface 3101b and the approval key reading interface 3101c are illustrated in FIGS. 5A, 5B and 5C, respectively. Each of the example screens of FIGS. 5B and 5C illustrates only components or configurations that differ from those of FIG. 5A.

As illustrated in FIG. 5A, the print setting input interface 3101a is substantially the same as a print setting content that is found in a general document creation software, and includes, for example, a printer selection button 3101-1 for selecting a predetermined network printer from a plurality of network printers, a print range selection button 3101-2 for selecting a print range, a print number selection button 3101-3 for selecting a number of copies to be printed, and a property button 3101-4 settable in detail according to a capability of the network printer.

As illustrated in FIG. 5b, the approval key creation interface 3101b includes an approval check box 3101-5 for determining whether or not to approve the electronic file, an encryption algorithm selection button 3101-6 for selecting an encryption algorithm for creating the encrypted approval key file from a plurality of registered algorithms, and a password entry box 3101-7 for inputting a password set by the approver and the electronic file creator beforehand with respect to each electronic file.

Such a selection of the encryption algorithm and an input of the password are used as a mechanism to increase security level. Therefore, when the password is actually input in the password entry box 3101-7, the input password is preferably displayed in a masked letter (e.g., *****) so as to reduce (if not eliminate) leakage of the password.

The approval key creation interface 3101b includes a confirmation section 3101-7b for confirming a presence or absence of creation of the approval key. As illustrated in the example of FIG. 5B, the approval check box 3101-5 is not checked by the approver, and the password is not input in the password entry box 3101-7, thereby displaying a message of "Not Create Approval Key" in the confirmation section 3101-7b. On the other hand, where the approval check box 3101-5 is checked by the approver, where an appropriate encryption algorithm is selected from the encryption algorithm selection button 3101-6, and where the password is input in the password entry box 3101-7, the confirmation section 3101-7b displays a message of "Create Approval Key".

As illustrated in FIG. 5C, the approval key reading interface 3101c includes a location selection button 3101-8 for selecting a location in which the approval key file is stored, a display section 3101-9 for displaying the approval key file when the approval key file exists, an encryption algorithm selection button 3101-10 for selecting the encryption algorithm used to encrypt the approval key file when the encrypted approval key file is decrypted, a password entry box 3101-11 for inputting a password set by the approver and the electronic file creator beforehand with respect to each electronic file, and a clear button 3101-12 for clearing a content being input or selected in the approval reading interface 3101c.

Moreover, the user interface unit 3101 for the approver includes a print preview button 3101-13 for displaying a print preview, a print execution button 3101-14 for executing generation of the approval key file or printing the electronic file, and a cancel button 3101-15 for canceling a series of operations including the print setting, approval key creation and approval key reading. The buttons 3101-13 through 3101-15 are disposed in a lower portion of the input screen of each of the interfaces 3101a through 3101c.

Figure 6A:
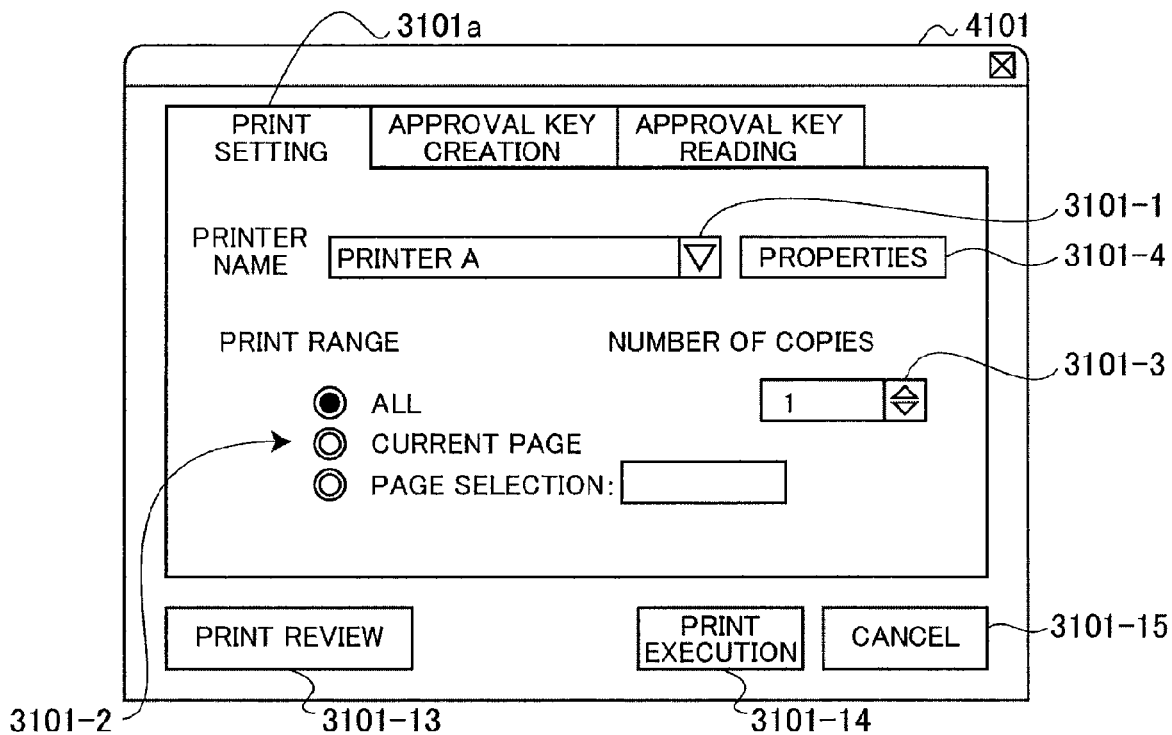
FIGS. 6A though 6C are schematic diagrams illustrating a user interface unit for the creator in the personal computer used by the creator according to the first embodiment of the present invention.
Figure 6B:
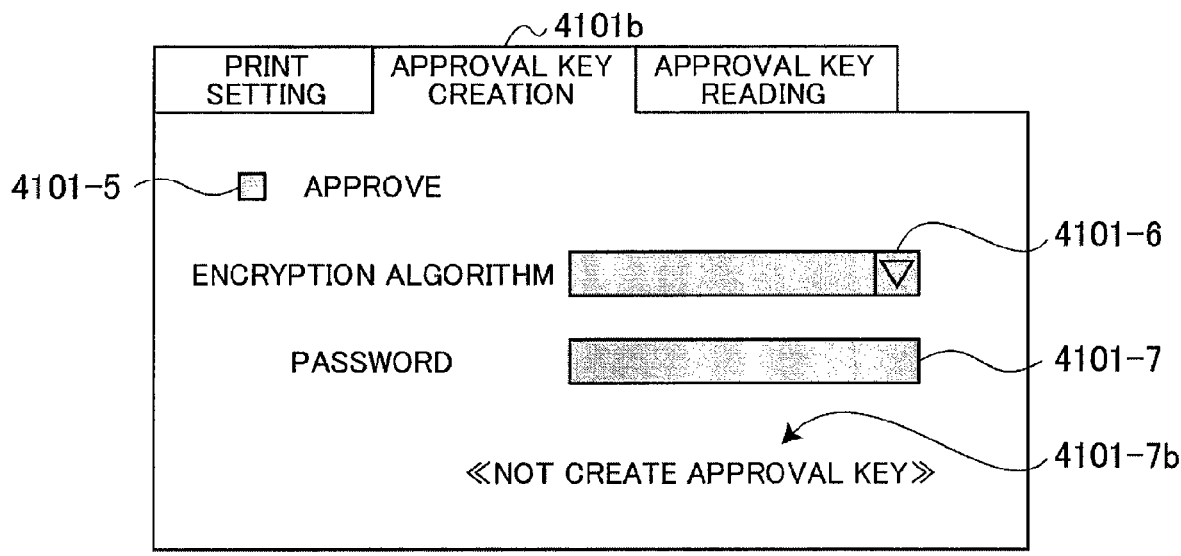
Figure 6C:
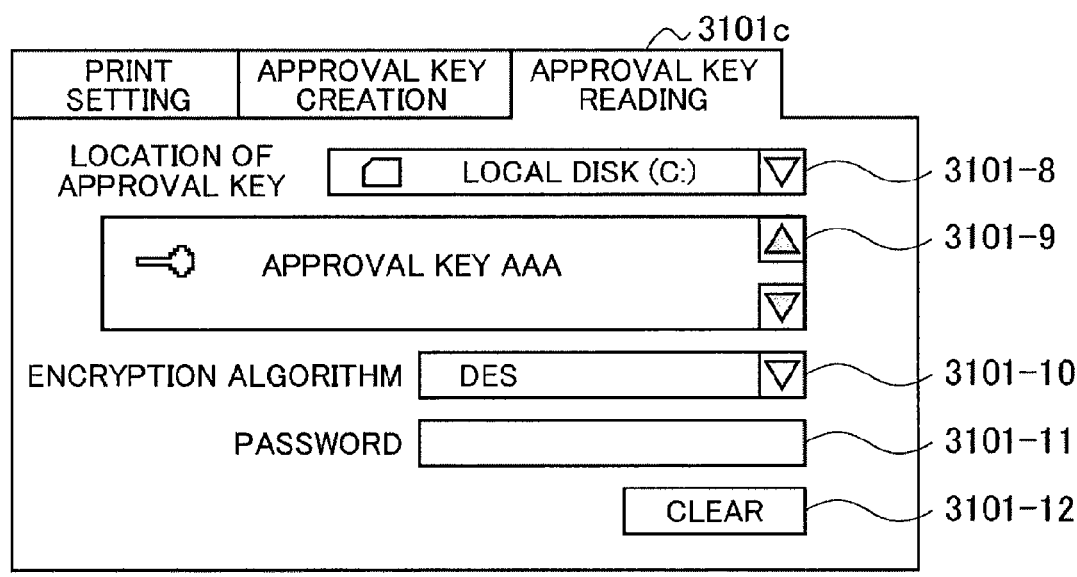

Referring to FIGS. 6A through 6C, examples of the user interface unit 4101 for the creator in the personal computer 120 are illustrated. As illustrated in FIGS. 6A through 6C, the user interface unit 4101 for the creator is similar to the user interface unit 3101 for the approver illustrated in FIGS. 5A through 5c except for an approval key creation interface 4101b. Therefore, only component and configuration of the user interface unit 4101 that differ from those of the user interface unit 3101 will be described, and like components will be given the same reference numerals as above and description thereof will be omitted. However, each of the examples of FIGS. 6B and 6C illustrates only component or configuration that differs from that of FIG. 6A.

As illustrated in FIG. 6B, the approval key creation interface 4101b includes an approval check box 4101-5, an encryption algorithm selection button 4106-6 and a password entry box 4101-7 each of which is set beforehand in such a manner not to receive an input from the creator, thereby reducing (if not eliminating) an occurrence of creating the approval key file and printing the electronic file by the creator using the approval key file without obtaining the approval from the approver.

A description is now given of an operation of a system according to the first embodiment of the present invention. Hereinafter, the personal computer 120 used by the approver includes the printer driver 310 dedicated to the network printer 110 described above with reference to FIG. 3 according to the first embodiment of the present invention, and the personal computer 130 used by the creator includes the printer driver 410 dedicated to the network printer 110 described above with reference to FIG. 4 according to the first embodiment.

Figure 7:
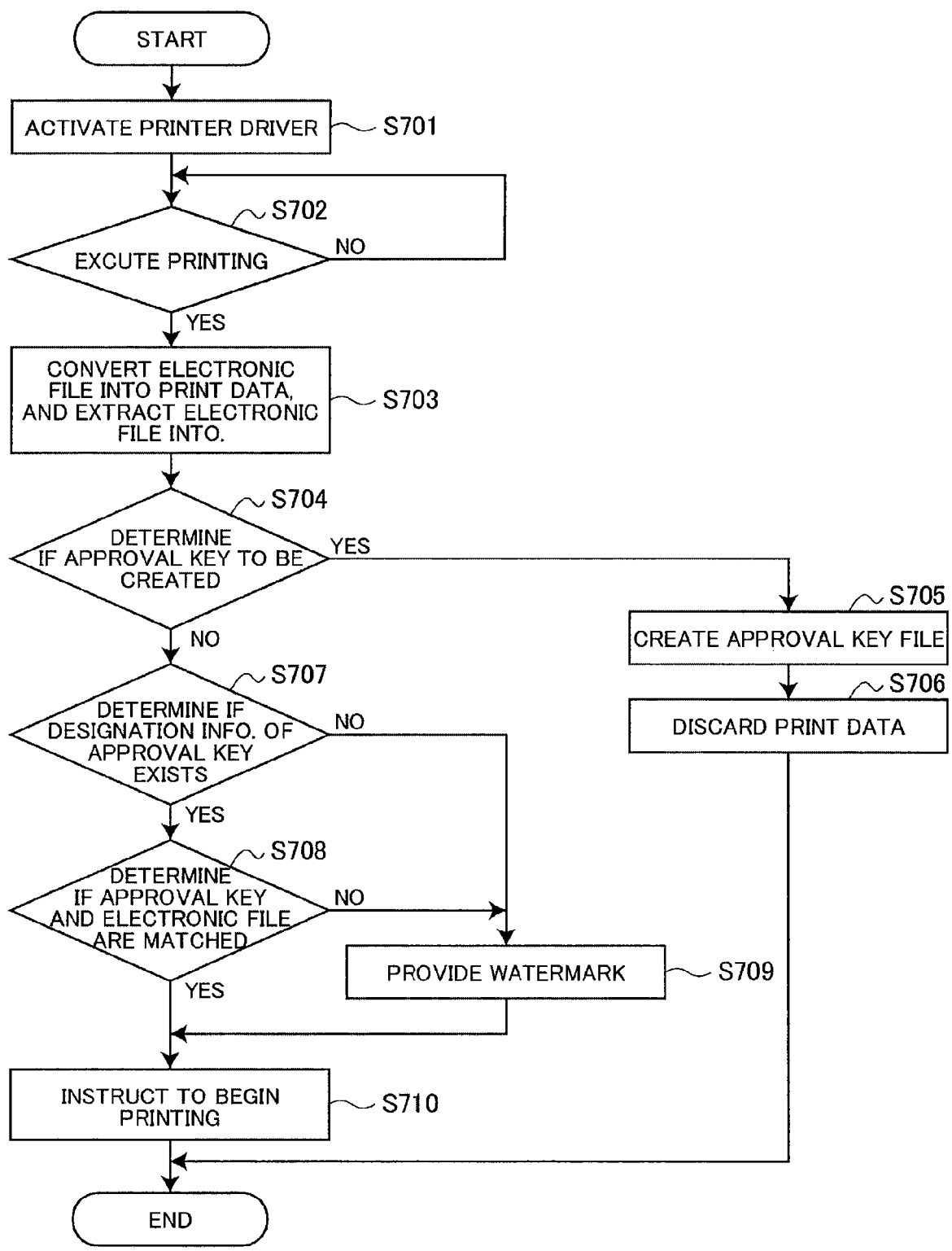
FIG. 7 is a flowchart illustrating a series of an example procedure for creating an approval key file by approving an electronic file by the approver according to the first embodiment of the present invention.

Referring to a flowchart of FIG. 7, a series of example processes for creating the approval key file by approving the electronic file by the approver is described. The creator creates the electronic file using the application 400 of the personal computer 130 and transmits the created electronic file to the personal computer 120 used by the approver through the network interface card 240. After receiving the electronic file transmitted from the creator, the approver activates the application 300 and opens the electronic file, thereby beginning of the series of the processes. When the approver confirms the content of the electronic file and determines to approve the electronic file, the printing is executed on the application 300.

Upon receiving the print command, the CPU 250 activates the printer driver 310 stored in the HDD 230, and instructs the CRT controller 221 to display the user interface unit 3101 for the approver on the CRT display 220 (step S701).

Next, the approver inputs setting information into a setting item input section of the user interface unit 3101, and the CPU 250 executes processes beyond the step S702 when the approver presses the print execution button 3101-14 (Yes in step S702).

Particularly, after the user interface unit 3101 for the approver is displayed, the approver clicks a tab of the approval key creation interface 3101b, thereby displaying the approval key creation interface 3101b. Next, the approver checks the approval check box 3101-5 and selects a desired encryption algorithm, for example, DES, using the encryption algorithm selection button 3101-6. The approver inputs the password in the password entry box 3101-7. Hereupon, the message of "Not Create Approval Key" displayed in the confirmation section 3101-7b illustrated in the FIG. 5b is changed to "Create Approval Key", thereby completing preparations for the approval key creation. When the approver presses the print execution button 3101-14, the creation of the approval key file begins.

In step S702, upon receiving the print execution command, the CPU 250 instructs the printer GDI driver 3102 to convert the electronic file into the print data based on the setting information input to the user interface unit 3101 for the approver.

Subsequently, in step S703, the CPU 250 instructs the approval information extraction unit 3103 to extract the electronic file information 340 to be used as electronic file approval information from the print data created by the printer GDI driver 3102. Upon receiving the instruction, the approval information extraction unit 3103 creates the electronic file information 340.

Moreover, the CPU 250 determines whether or not to create the approval key file 330 based on the setting information input to the user interface unit 3101 for the approver (step S704). Where the CPU 250 determines to create of the approval key file 330 (Yes in step S704), the CPU 250 instructs the approval key creation unit 3104 to create the approval key file 330.

Upon receiving the instruction of creating the approval key file 330 from the CPU 250, the approval key creation unit 3104 creates the approval key file 330 based on the electronic file information 340 using the encrypted secret key algorithm such as DES selected by the approver (step S705). Subsequently, the CPU 250 instructs the printer GDI driver 3102 to discard the print data (step S706). Upon receiving the discard command of the print data from the CPU 250, the printer GDI driver 3102 discards the print data.

Therefore, when the approver approves the predetermined electronic file, the approval key file 330 is generated as the electronic information.

On the other hand, where the CPU 250 determines not to create the approval key file 330 based on the setting information input to the user interface unit 3101 (No in step S704), for example, where the electronic file approved by the approver is actually printed for confirmation, and where the approver prints and receives the approved electronic file without returning the approval key file 330 to the creator, the CPU 250 executes the steps S707 and S708. Here, the approval key file 330 is already created by the approver and is stored in a predetermined location (e.g., a local disk C drive of the hard disk).

Particularly, the approver makes to display the print setting input interface 3101*a*. The approver selects the network printer 110 executing the print operation from print selection button 3101-1 in such a manner to select in the normal document creation software and the like. The approver specifies the print range using the print range selection button 3101-2 as necessary, and specifies a number of copies using the print number selection button 3101-3. Here, the approver may use the property button 3101-4 to perform the print setting in detail according to the print capability of the network printer 110.

Next, the approver makes to display the approval key reading interface 3101*c* and designates a location in which the created approval key file 330 is stored using the location selection button 3101-8. The approver selects the approved approval key file 330 from the approval key files displayed in the display section 3101-9. The approver selects the encryption algorithm by which the approval key file 330 is encrypted, and inputs the password in the password entry box 3101-11. Then, the approver presses the print execution button 3101-14 to execute the process of step S702.

Where the creation of the approval key file 330 is not included in the setting information input to the user interface unit 3101 by the approver (No in step S704), flow proceeds to step S707 in which the CPU 250 determines whether or not designation information of the approval key file 330 exists. Where the designation information of the approval key file 330 is determined to exist (Yes in step S707), the CPU 250 instructs the approval key authentication unit 3105 to authenticate the approve key file 330. Upon receiving the authentication instruction from the CPU 250, the approve key authentication unit 3105 analyzes the approval key file 330 by decrypting thereof, and collates the decrypted approval key file 330 with the electronic file information 340 created in step S703.

Where the approval key file 330 and the electronic file information 340 are determined to be matched based on the collation by the approval key authentication unit 3105 (Yes in step S708), the CPU 250 provides a print start command to the print manager 3106, and subsequently, the print manager 3106 begins a print process (step S710). Upon receiving the print start command from the CPU 250, the print manager 3106 creates the spool file 320 and transmits to the network printer 110 through the language monitor 3107, the port monitor 350 and the port driver 360. The print manager 3106 deletes the electronic file information 340 and finishes the series of processes after transmitting the spool file 320 to the network printer 110. The network printer 110 receives the spool file 320 and prints information of the spool file 320 on the recording medium.

Figure 8:
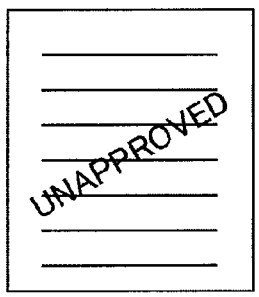
FIG. 8 is an example of a recording medium having a watermark.

On the other hand, where the designation information of the approval key file 330 is determined not to exist (No in step S707), and where the approval key file 330 and the electronic file information 340 are determined not to be matched (No in step S708), the CPU 250 instructs the printer GDI driver 3102 to provide the watermark indicating the electronic file being disapproved to the print data (step S709). The CPU 250 provides the print start command to the print manager 3106, and the print manager 3106 begins the print process (step S710). Upon receiving the print start command from the CPU 250, the print manager 3106 creates the spool file 320 and transmits to the network printer 110 through the language monitor 3107, the port monitor 350 and the port driver 360. The print manager 3106 deletes the electronic file information 340 and finishes the series of processes after transmitting the spool file 320 to the network printer 110. The network printer 110 receives the spool file 320 and prints the information of the spool file 320 with the watermark on the recording medium as illustrated in FIG. 8.

Figure 9:
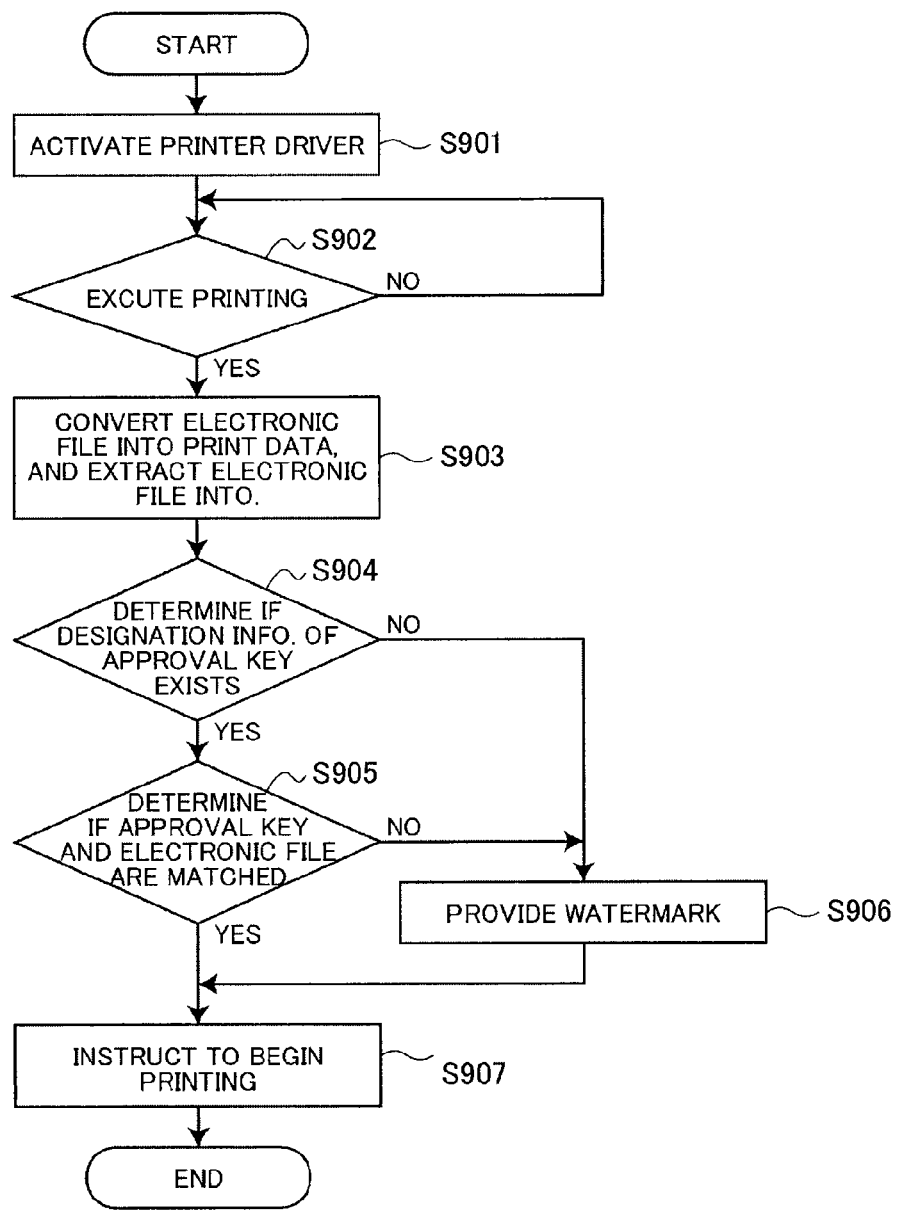
FIG. 9 is a flowchart illustrating a series of an example procedure when the creator prints the electronic file approved by the approver according to the first embodiment of the present invention.

Referring to a flowchart of FIG. 9, a series of example processes when the creator prints the electronic file approved by the approver is described. The creator creates the electronic file using the application 400 of the personal computer 130 and transmits the created electronic file to the personal computer 120 used by the approver through the network interface card 240. After receiving the electronic file transmitted from the creator, the approver creates the approval key file 430 according to the approval process of the electronic file as described above with reference to FIG. 7. The approval key file 430 created by the approver is transmitted to the creator. According to the first embodiment, the approval key file 430 is delivered through the memory 270 of the external memory device. Alternatively, the approval key file 430 may be delivered using a distribution mechanism such as electronic mail.

When the creator activates the application 400 by which the electric file is created and opens the electronic file, the series of the processes begin. The creator executes the printing on the application 400.

Upon receiving the print command, the CPU 250 activates the printer driver 410 stored in the HDD 230, and instructs the CRT controller 221 to display the user interface unit 4101 (illustrated in FIGS. 6A to 6C) on the CRT display 220 (step S901).

Next, when the creator inputs the setting information in a setting item input section of the user interface unit 4101 and presses the print execution button 3101-14, the CPU 250 executes the processes beyond step S902 (Yes in step S902).

Particularly, after the user interface unit 4101 for the creator is displayed, the creator clicks a tab of the print setting user interface 3101a, thereby displaying the print setting user interface 3101a. The creator selects the network printer 110 executing the print operation from the printer selection button 3101-1 in such a manner to select in the normal document creation software and the like. The creator specifies the print range using the print range selection button 3101-2 as necessary, and specifies a number of copies using the print number selection button 3101-3. Here, the creator may use the property button 3101-4 to perform the print setting in detail according to the print capability of the network printer 110.

Next, the creator makes to display the approval key reading interface 3101c, and designates a location in which the created approval key file 430 is stored using the location selection button 3101-8. The creator selects the approved approval key file 430 from the approval key files displayed in the display section 3101-9. The creator selects the encryption algorithm by which the approval key file 430 is encrypted, and inputs the password in the password entry box 3101-11. Then, the creator presses the print execution button 3101-14 to execute the process of step S902. Here, the creator is notified of the encryption algorithm of the approval key file 430 and the password separately from the approver.

In step S902, upon receiving the print execution command, the CPU 250 instructs the printer GDI driver 4102 to convert the electronic file into the print data based on the setting information input to the user interface unit 4101 for the creator.

Subsequently, in step S903, the CPU 250 instructs the approval information extraction unit 4103 to extract the electronic file information 440 to be used as electronic file approval information from the print data converted by the printer GDI driver 4102. Upon receiving the instruction, the approval information extraction unit 4103 creates the electronic file information 440.

In step S904, the CPU determines whether or not designation information of the approval key 430 exists. Where the designation information of the approval key file 430 is determined to exist (Yes in step S904), the CPU 250 instructs the approval key authentication unit 4104 to authenticate the approve key file 430. Upon receiving the authentication instruction from the CPU 250, the approve key authentication unit 4104 analyzes the approval key file 430 by decrypting thereof, and collates the decrypted approval key file 430 with the electronic file information 440 created in step S903.

Where the approval key file 430 and the electronic file information 440 are determined to be matched based on the collation by the approval key authentication unit 4104 (Yes in step S905), the CPU 250 provides the print start command to the print manager 4105, and subsequently, the print manager 4105 begins a print process (step S907). Upon receiving the print start command from the CPU 250, the print manager 4105 creates the spool file 420 and transmits to the network printer 110 through the language monitor 4106, the port monitor 450 and the port driver 460. The print manager 4105 deletes the electronic file information 440 and finishes the series of processes after transmitting the spool file 420 to the network printer 110. The network printer 110 receives the spool file 420 and prints information of the spool file 420 on the recording medium.

On the other hand, where the designation information of the approval key file 430 is determined not to exist (No in step S904), and where the approval key file 430 and the electronic file information 440 are determined not to be matched (No in step S905), the CPU 250 instructs the printer GDI driver 4102 to provide the watermark indicating the electronic file being disapproved to the print data (step S906). The CPU 250 provides the print command to the print manager 4105, and the print manager 4105 begins the print process (step S907). Upon receiving the print command from the CPU 250, the print manager 4105 creates the spool file 420 and transmits to the network printer 110 through the language monitor 4106, the port monitor 450 and the port driver 460. The print manager 4105 deletes the electronic file information 440 and finishes the series of processes after transmitting the spool file 420 to the network printer 110. The network printer 110 receives the spool file 420 and prints the information of the spool file 420 with the watermark on the recording medium as illustrated in FIG. 8.

According to the first embodiment of the present invention described above, the approval process can be completed without labor of printing and impressing a stamp of the approver in the process of approving the designated electronic file. Since the electronic file is not printed, an unnecessary printed matter can be reduced in a case of returning the electronic file being under approval process. Moreover, a special device such as a server computer and a printer is not needed to execute the approval process according to the first embodiment, thereby reducing a cost.

A Second Embodiment

Each of an information terminal device for an approver and an information terminal device for an electronic file creator according to a second embodiment of the present invention obtains storage location information of an electronic file from print data without designating the storage location of an approval key file when each of the approver and the creator prints the print data, and includes an approval key detection unit that automatically detects the approval key file. The information terminal devices for the approver and the electronic file creator according to the second embodiment of the present invention are respectively substantially the same as the personal computers 120 and 130 serving as the information terminal devices for the approver and the electronic file creator according to the first embodiment of the present invention described above. Thus, only components and/or configurations of the information terminal devices of the second embodiment that differ from those of the first embodiment will be described, and like components will be given the same reference numerals as above and description thereof will be omitted.

Figure 10:
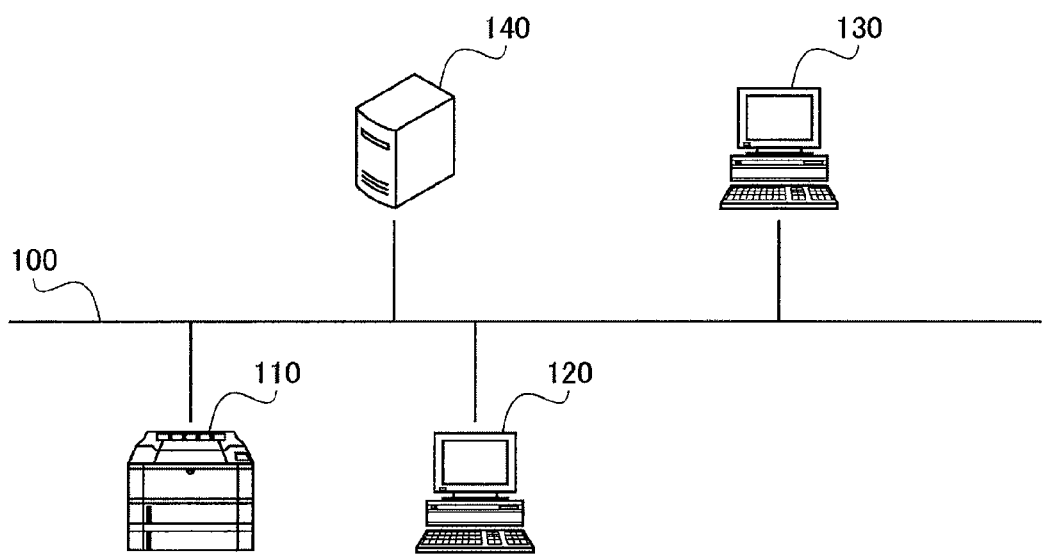
FIG. 10 is a schematic diagram illustrating an electronic file approval management system according to a second embodiment of the present invention.

Referring to FIG. 10, an electronic file approval management system according to the second embodiment is illustrated. The electronic file approval management system includes the network 100 such as the local area network (LAN) operated in an office, the network printer 110 that prints an electronic file, the personal computer 120 that is used by the approver of the electronic file as the information terminal device for the approver, the personal computer 130 that is used by the creator of the electronic file as the information terminal device for the creator, and a file server 140 that accumulates the electronic file and the like.

Physical arrangements of the personal computers 120 and 130 according to the second embodiment are substantially the same as those of the personal computers 120 and 130 according to the first embodiment (see FIG. 2).

Figure 11:
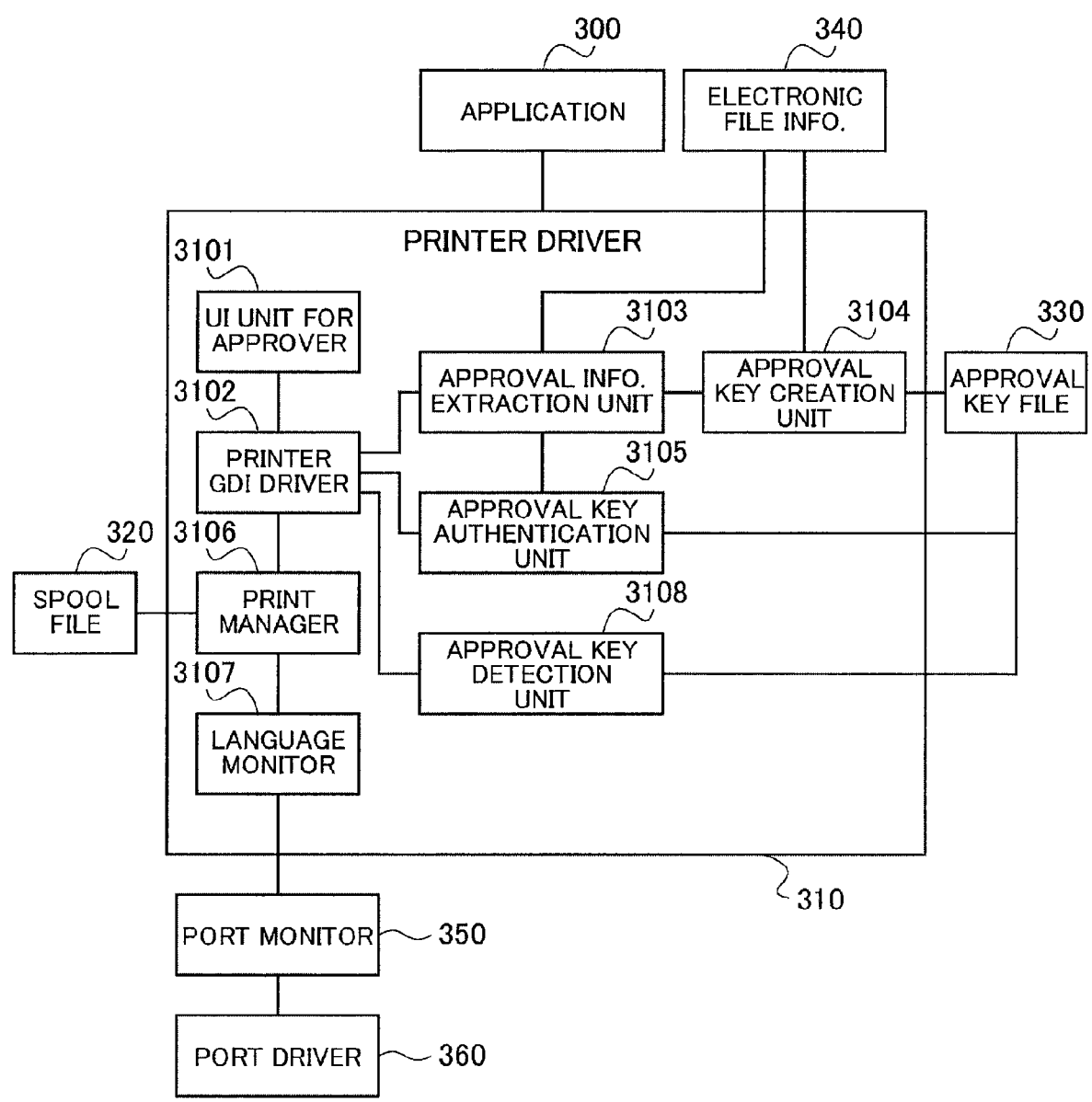
FIG. 11 is a block diagram illustrating modules of a personal computer used by an approver according to the second embodiment of the present invention.

Referring to FIG. 11, modules of the personal computer 120 used by the approver according to the second embodiment are illustrated. The personal computer 120 of the second embodiment includes the modules that are included in the personal computer 120 of the first embodiment, and the printer driver 310 of the second embodiment includes an approval key detection unit 3108 in addition to the elements included in the first embodiment.

The approval key detection unit 3108 serving as a program obtains the storage location information of the electronic file to be printed from the print data created by the printer GDI driver 3102.

Figure 12:
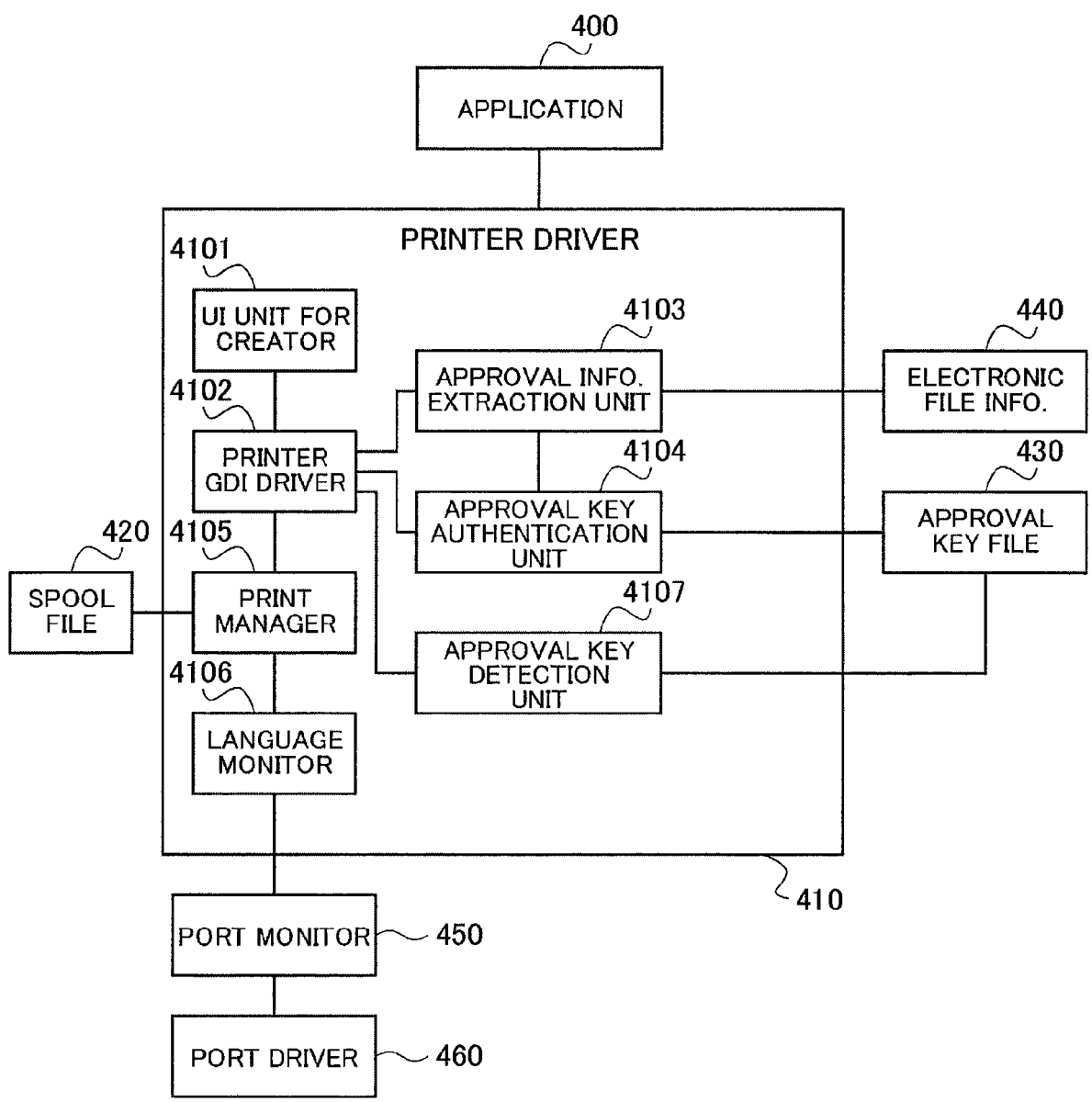
FIG. 12 is a block diagram illustrating modules of another personal computer used by a creator according to the second embodiment of the present invention.

Referring to FIG. 12, modules of the personal computer 130 used by the creator according to the second embodiment are illustrated. The personal computer 130 of the second embodiment includes the modules that are included in the personal computer 130 of the first embodiment, and the printer driver 410 of the second embodiment includes an approval key detection unit 4107 in addition to the elements included in the first embodiment.

The approval key detection unit 4107 serving as a program acquires the storage location information of the electronic file to be printed from the print data created by the printer GDI driver 4102.

A description is now given of an operation of a system according to the second embodiment of the present invention. The personal computer 120 used by the approver includes the printer driver 310 dedicated to the network printer 110 described above with reference to FIG. 11 according to the second embodiment of the present invention, and the personal computer 130 used by the creator includes the printer driver 410 dedicated to the network printer 110 described above with reference to FIG. 12 according to the second embodiment.

Figure 13:
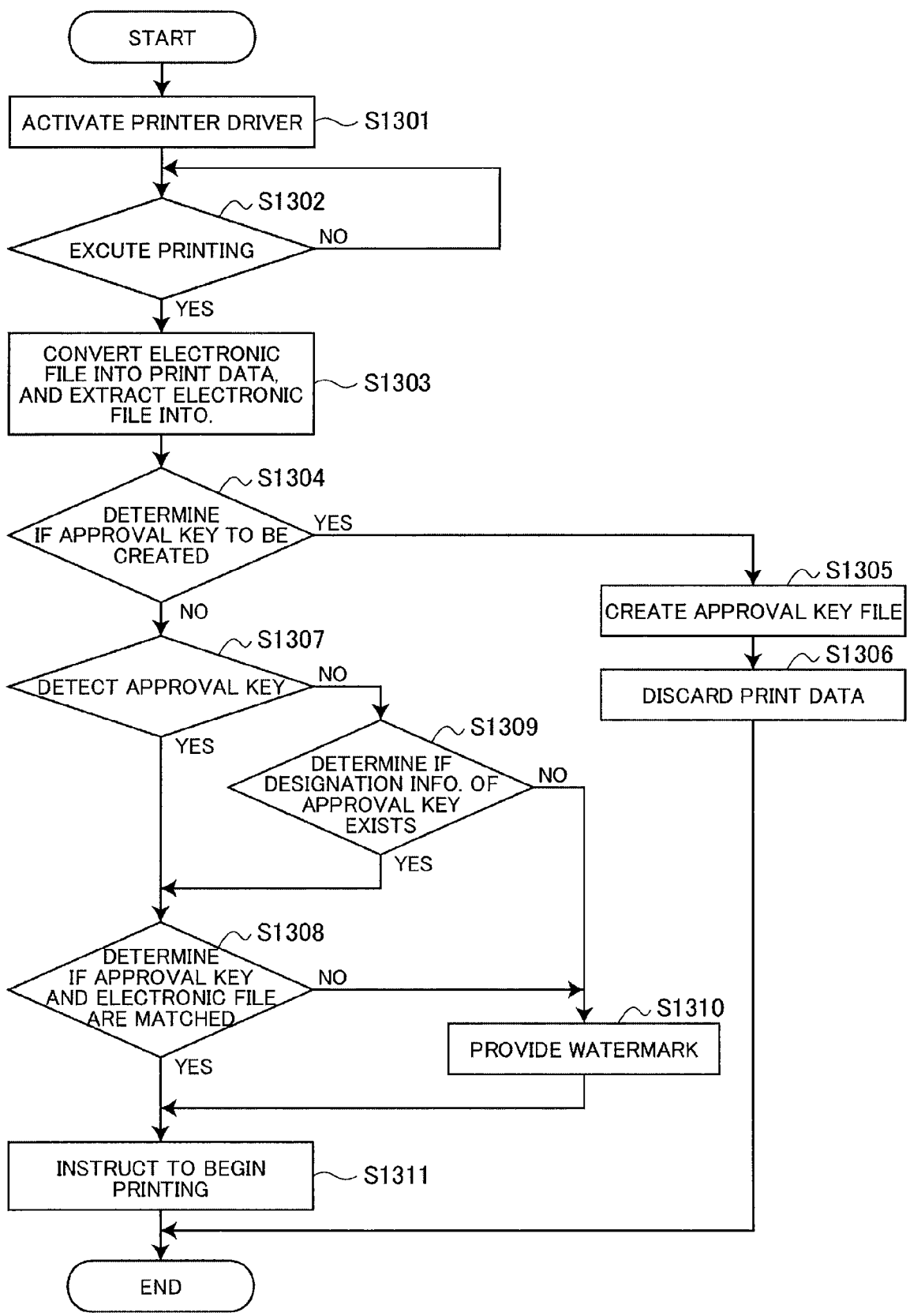
FIG. 13 is a flowchart illustrating a series of an example procedure for creating an approval key file by approving an electronic file by the approver according to the second embodiment of the present invention.

Referring to FIG. 13, a series of example processes for creating the approval key file by approving the electronic file by the approver according to the second embodiment is described. After the creator creates the electronic file using the application 400 of the personal computer 130 and stores the created electronic file in a predetermined location of the file server 140 through the network interface card 240, the approver activates the application 300 and opens the electronic file, thereby beginning of the series of the processes. When the approver confirms the content of the electronic file and determines to approve the electronic file, the printing on the application 300 is executed.

Upon receiving the print command, the CPU 250 activates the printer driver 310 stored in the HDD 230, and instructs the CRT controller 221 to display the user interface unit 3101 for the approver on the CRT display 220 (step S1301).

Next, the approver inputs setting information into a setting item input section of the user interface unit 3101, and the CPU 250 executes processes beyond the step S1302 when the approver presses the print execution button (Yes in step S1302).

Particularly, after the user interface unit 3101 for the approver is displayed, the approver clicks a tab of the approval key creation interface 3101b, thereby displaying the approval key creation interface 3101b. Next, the approver checks the approval check box 3101-5 and selects a desired encryption algorithm, for example, DES, using the encryption algorithm selection button 3101-6. The approver inputs the password in the password entry box 3101-7. Hereupon, the message of "Not Create Approval Key" displayed in the confirmation section 3101-7b illustrated in the FIG. 5b is changed to "Create Approval Key", thereby completing preparations for the approval key creation. When the approver presses the print execution button 3101-14, the creation of the approval key file begins.

In step S1302, upon receiving the print execution command, the CPU 250 instructs the printer GDI driver 3102 to convert the electronic file into the print data based on the setting information input to the user interface unit 3101 for the approver.

Subsequently, in step S1303, the CPU 250 instructs the approval information extraction unit 3103 to extract the electronic file information 340 to be used as electronic file approval information from the print data created by the printer GDI driver 3102. Upon receiving the instruction, the approval information extraction unit 3103 creates the electronic file information 340.

Moreover, the CPU 250 determines whether or not to create the approval key file 330 based on the setting information input to the user interface unit 3101 for the approver (step S1304). Where the CPU 250 determines to create the approval key file 330 (Yes in step S1304), the CPU 250 instructs the approval key creation unit 3104 to create the approval key file 330.

Upon receiving the instruction of creating the approval key file 330 from the CPU 250, the approval key creation unit 3104 creates the approval key file 330 based on the electronic file information 340 using the encrypted secret key algorithm such as DES selected by the approver (step S1305). Subsequently, the CPU 250 instructs the printer GDI driver 3102 to discard the print data (step S1306). Upon receiving the discard command of the print data from the CPU 250, the printer GDI driver 3102 discards the print data.

Therefore, when the approver approves the predetermined electronic file, the approval key file 330 is generated as the electronic file.

On the other hand, where the CPU 250 determines not to create the approval key file 330 based on the setting information input to the user interface unit 3101 for the approver (No in step S1304), that is, where the approver prints the electronic file being already approved without creating the approval key file, the CPU 250 executes the step S1307 through S1311. Here, the approval key file 330 is already created by the approver and is stored in a predetermined location (e.g., a local disk C drive of the hard disk).

Particularly, the approver makes to display the print setting input interface 3101a. The approver selects the network printer 110 executing the print operation from print selection button 3101-1 in such a manner to select in the normal document creation software and the like. The approver specifies the print range using the print range selection button 3101-2 as necessary, and specifies a number of copies using the print number selection button 3101-3. Here, the approver may use the property button 3101-4 to perform the print setting in detail according to the print capability of the network printer 110.

Next, the approver makes to display the approval key reading interface 3101c, selects the encryption algorithm by which the approval key file 330 is encrypted, and inputs the password in the password entry box 3101-11. Where the approver knows the storage location of the approval key file 330 beforehand, the approver designates the location in which the created approval key file 330 is stored using the location selection button 3101-8. The approver selects the approved approval key file 330 from the approval key files displayed in the display section 3101-9. However, where the approver does not know the storage location of the approval key file 330, entry is not needed in the location selection button 3101-8 or the display section 3101-9. Then, the approver presses the print execution button 3101-14 to execute the process of step S1302.

Where the creation of the approval key file 330 is not included in the setting information input to the user interface unit 3101 by the approver (No in step S1304), flow proceeds to step S1307 in which the CPU 250 instructs the approval key detection unit 3108 to detect the approval key file 330. Upon receiving the detection instruction from the CPU 250, the approval key detection unit 3108 obtains the location information having the storage location of the electronic file from the print data created by the printer GDI driver 3102. Where the approval key file 330 is detected (Yes in step S1307), the CPU 250 instructs the approval key authentication unit 3105 to authenticate the approval key file 330. Upon receiving the authentication instruction, the approval key authentication unit 3105 analyzes the approval key file 330 by decrypting thereof, and collates the decrypted approval key file 330 with the electronic file information 340 created in step S1303.

Where the approval key file 330 and the electronic file information 340 are determined to be matched based on the collation by the approval key authentication unit 3105 (Yes in step S1308), the CPU 250 provides a print start command to the print manager 3106, and subsequently, the print manager 3106 begins the print process (step S1311). Upon receiving the print start command from the CPU 250, the print manager 3106 creates the spool file 320 and transmits to the network printer 110 through the language monitor 3107, the port monitor 350 and the port driver 360. The print manager 3106 deletes the electronic file information 340 and finishes the series of processes after transmitting the spool file 320 to the network printer 110. The network printer 110 receives the spool file 320 and prints information of the spool file 320 on the recording medium.

On the other hand, where the approval key file 330 is not detected (No in step S1307), the CPU 250 determines whether or not the designation information of the approval key file 330 exists (step S1309). Where the designation information of the approval key file 330 is determined to exist, the CPU 250 instructs the approval key authentication unit 3105 to authenticate the approval key file 330. Upon receiving the authentication instruction from the CPU 250, the approval key authentication unit 3105 analyzes the approval key file 330 by decrypting thereof, and collates the decrypted approval key file 330 with the electronic file information 340 created in step S1303. Where the decrypted approval key file 330 and the electronic file information 340 are matched (Yes in step S1308), the print manger 3106 executes the print process (step S1311).

On the other hand, where the designation information of the approval key file 330 is determined not to exist (No in step S1309), and where the approval key file 330 and the electronic file information 340 are determined not to be matched (No in step S1308), the CPU 250 instructs the printer GDI driver 3102 to provide the watermark indicating the electronic file being disapproved to the print data (step S1310). Subsequently, the CPU 250 provides the print start command to the print manager 3106, and the print manager 3106 begins the print process (step S1311). Upon receiving the print start command from the CPU 250, the print manager 3106 creates the spool file 320 and transmits to the network printer 110 through the language monitor 3107, the port monitor 350 and the port driver 360. The print manager 3106 deletes the electronic file information 340 and finishes the series of processes after transmitting the spool file 320 to the network printer 110. The network printer 110 receives the spool file 320 and prints the information of the spool file 320 with the watermark on the recording medium as illustrated in FIG. 8.

Figure 14:
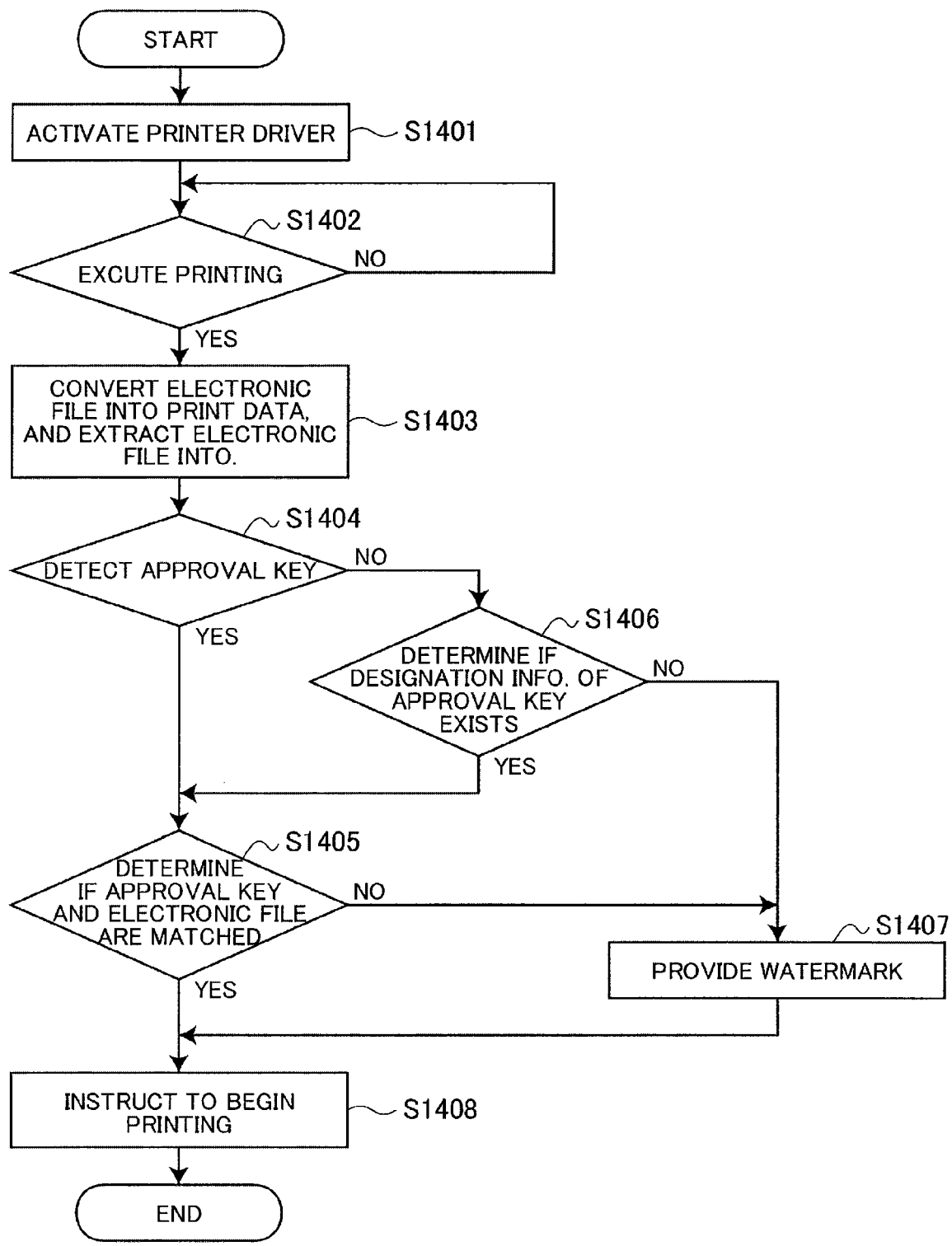
FIG. 14 is a flowchart illustrating a series of an example procedure when the creator prints the electronic file approved by the approver according to the second embodiment of the present invention.

Referring to a flowchart of FIG. 14, a series of example processes when the creator prints the electronic file approved by the approver is described. The creator creates the electronic file using the application 400 of the personal computer 130 and stores the electronic file in a predetermined location of the file server 140 through the network interface card 240, and the approver creates the approval key file 430 in accordance with the approval process of the electronic file described with reference to FIG. 13. The approved file 430 created by the approver is stored in the predetermined location of the file server 140 in which the electronic file is also stored.

When the creator activates the application 400 by which the electric file is created and opens the electronic file, the series of the processes begin. The creator executes the printing command on the application 400.

Upon receiving the print command, the CPU 250 activates the printer driver 410 stored in the HDD 230, and instructs the CRT controller 221 to display the user interface unit 4101 (illustrated in FIGS. 6A to 6C) on the CRT display 220 (step S1401).

Next, when the creator inputs the setting information in a setting item input section of the user interface unit 4101 and presses the print execution button 3101-14, the CPU executes the processes beyond step S1402 (Yes in step S1402).

Particularly, after the user interface unit 4101 for the creator is displayed, the creator clicks a tab of the print setting user interface 3101a, thereby displaying the print setting user interface 3101a. The creator selects the network printer 110 executing the print operation from the printer selection button 3101-1 in such a manner to select in the normal document creation software and the like. The creator specifies the print range using the print range selection button 3101-2 as necessary, and specifies a number of copies using the print number selection button 3101-3. Here, the creator may use the property button 3101-4 to perform the print setting in detail according to the print capability of the network printer 110.

Next, the creator makes to display the approval key reading interface 3101c, selects the encryption algorithm by which the approval key file 430 is encrypted, and inputs the password in the password entry box 3101-11. Where the creator knows the storage location of the approval key file 430 beforehand, the creator designates the location in which the created approval key file 430 is stored using the location selection button 3101-8. The creator selects the approved approval key file 430 from the approval key files displayed in the display section 3101-9. However, where the creator does not know the storage location of the approval key file 430, entry is not needed in the location selection button 3101-8 or the display section 3101-9. Then, the creator presses the print execution button 3101-14 to execute the process of step S1402.

In step S1402, upon receiving the print execution command, the CPU 250 instructs the printer GDI driver 4102 to convert the print data into the electronic file based on the setting information input to the user interface unit 4101.

Subsequently, in step S1403, the CPU 250 instructs the approval information extraction unit 4103 to extract the electronic file information 440 to be used as electronic file approval information from the print data converted by the printer GDI driver 4102. Upon receiving the instruction, the approval information extraction unit 4103 creates the electronic file information 440.

In step S1404, the CPU 250 instructs the approval key detection unit 4107 to detect the approval key file 430. Upon receiving the instruction from the CPU 250, the approval key detection unit 4107 obtains the location information having the storage location of the electric file from the print data created by the printer GDI driver 3102. Where the approval key file 430 is determined to exist (Yes in step S1404), the CPU 250 instructs the approval key authentication unit 4104 to authenticate the approval key file 430. Upon receiving the authentication instruction from the CPU 250, the approval key authentication unit 4104 analyzes the approval key file 430 by decrypting thereof and collates the encrypted approval key file 430 with the electronic file information 440 created in step S1403.

Where the approval key file 430 and the electronic file information 440 are determined to be matched based on the collation by the approval key authentication unit 4104 (Yes in step S1405), the CPU 250 provides a print start command to the print manager 4105, and subsequently, the print manager 4105 begins a print process (step S1408). Upon receiving the print start command from the CPU 250, the print manager 4105 creates the spool file 420 and transmits to the network printer 110 through the language monitor 4106, the port monitor 450 and the port driver 460. The print manager 4105 deletes the electronic file information 440 and finishes the series of processes after transmitting the spool file 420 to the network printer 110. The network printer 110 receives the spool file 420 and prints information of the spool file 420 on the recording medium.

On the other hand, where the approval key file 430 is not detected (No in step S1404), the CPU 250 determines whether or not the designation information of the approval key file 430 exists (step S1406). Where the designation information of the approval key file 430 is determined to exist, the CPU 250 instructs the approval key authentication unit 4104 to authenticate the approval key file 430. Upon receiving the authentication instruction from the CPU 250, the approval key authentication unit 4104 analyzes the approval key file 430 by decrypting thereof, and collates the decrypted approval key file 430 with the electronic file information 440 created in step S1403. Where the decrypted approval key file 430 and the electronic file information 430 are matched (Yes in step S1405), the print manger 4105 executes the print process (step S1408).

On the other hand, where the designation information of the approval key file 430 is determined not to exist (No in step S1406), and where the approval key file 430 and the electronic file information 440 are determined not to be matched (No in step S1405), the CPU 250 instructs the printer GDI driver 4102 to provide the watermark indicating the electronic file being disapproved to the print data (step S1407). Subsequently, the CPU 250 provides the print start command to the print manager 4105, and the print manager 4105 begins the print process (step S1408). Upon receiving the print start command from the CPU 250, the print manager 4105 creates the spool file 420 and transmits to the network printer 110 through the language monitor 4106, the port monitor 450 and the port driver 460. The print manager 4105 deletes the electronic file information 440 and finishes the series of processes after transmitting the spool file 420 to the network printer 110. The network printer 110 receives the spool file 420 and prints the information of the spool file 420 with the watermark on the recording medium as illustrated in FIG. 8.

Therefore, in addition to the advantages of the first embodiment described above, the approval key file of the predetermined electronic file is automatically detected in the process of approving the predetermined electronic file, thereby reducing (if not eliminating) an occurrence of an inconvenience in operation of designating the approval key file of the predetermined electronic file according to the second embodiment of the present invention.

Moreover, the predetermined electric file and the approval key file thereof are commonly managed by a general file server, thereby reducing (if not eliminating) an occurrence of an inconvenience of delivering the approval electric key file from the approver of the electronic file according to the second embodiment of the present invention described above.

A Third Embodiment

An information terminal device for an approver according to a third embodiment of the present invention is similar to the personal computer 120 serving as the information terminal device for the approver according to the second embodiment described above except for a file creator distinction unit 3109 (described later). Only component and/or configuration of the information terminal device of the third embodiment that differ from those of the second embodiment will be described, and like components will be given the same reference numerals as above and description thereof will be omitted.

The file creator distinction unit 3109 compares electronic file creator information included in electronic file information and login name information of the information terminal device for the approver. Where the electronic file creator information and the login name information are matched, the file creator distinction unit 3109 finishes a process of creating an approval key file. On the other hand, where the electronic file creator information and the login name information are not matched, the file creator distinction unit 3109 executes the process of creating the approval key file.

Figure 15:
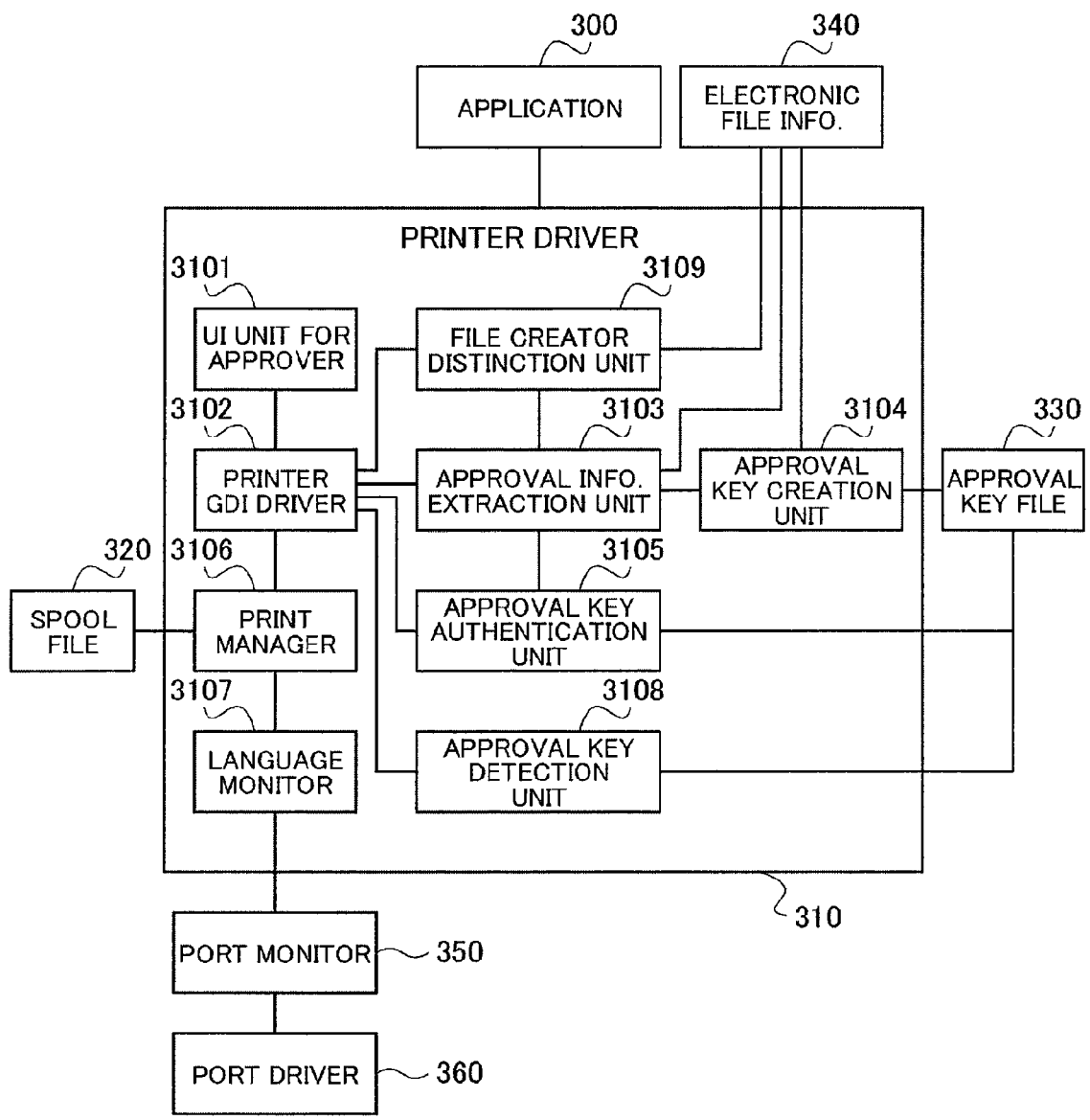
FIG. 15 is a block diagram illustrating modules of a personal computer used by an approver according to a third embodiment of the present invention.

Referring to FIG. 15, modules of the personal computer 120 used by the approver according to the third embodiment is illustrated. The personal computer 120 of the third embodiment includes the modules that are included in the personal computer 120 of the second embodiment, and the printer driver 310 of the third embodiment includes the file creator distinction unit 3109 in addition to the elements included in the second embodiment.

The file creator distinction unit 3109 serving as a program compares the electronic file creator information included in the electronic file information 340 and the login name of a person using the personal computer 120 and distinguishes whether or not a person approving the created electric file is a person who created the electric file.

Figure 16:
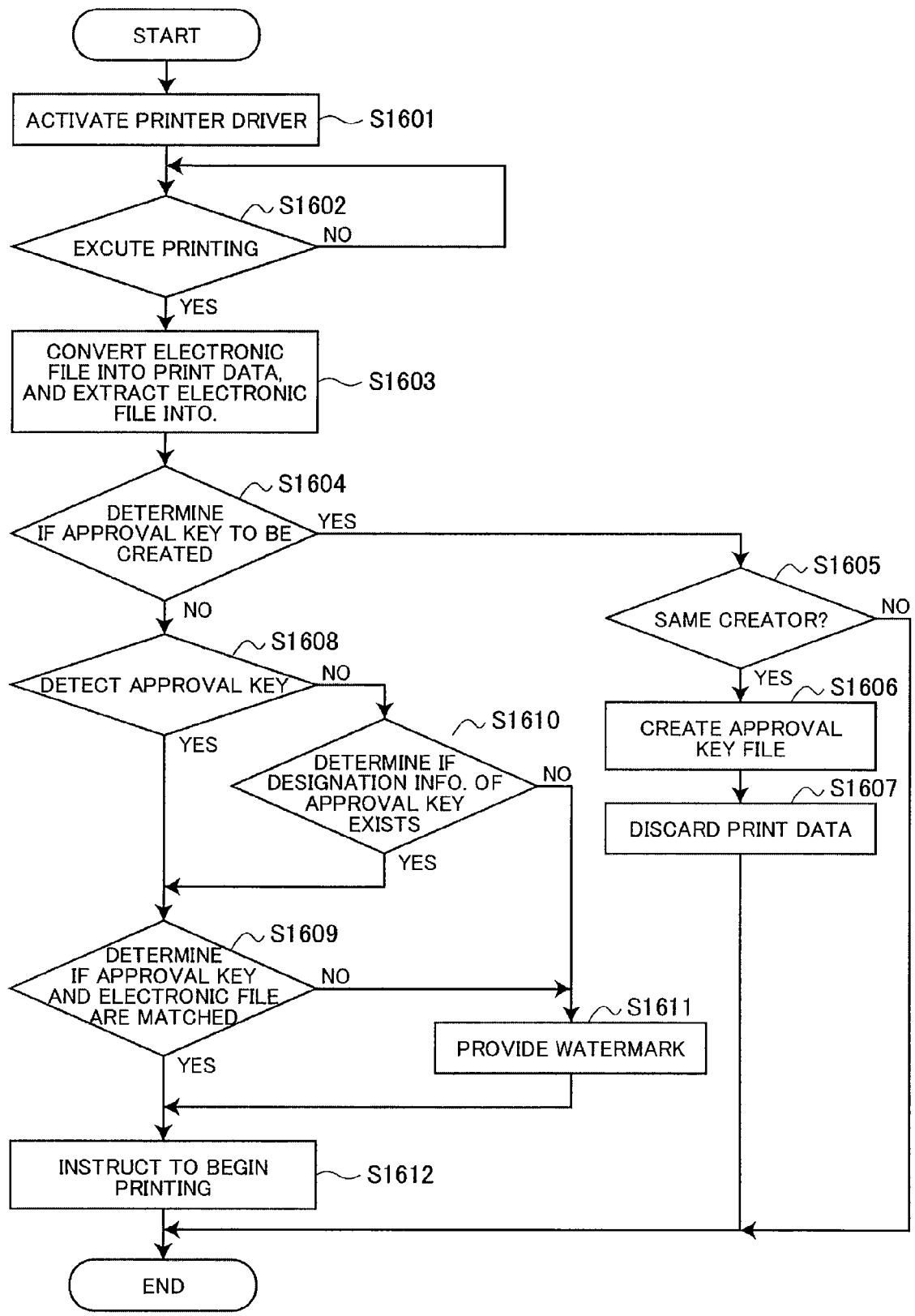
FIG. 16 is a flowchart illustrating a series of example procedure for creating an approval key file by approving an electronic file by the approver according to the third embodiment of the present invention.

Referring to FIG. 16, a series of example processes for creating the approval key file by approving the electronic file by the approver according to the third embodiment is described. After the creator creates the electronic file using the application 400 of the personal computer 130 and stores the created electronic file in a predetermined location of the file server 140 through the network interface card 240, the approver activates the application 300 and opens the electronic file created by the creator, thereby beginning of the series of the processes. When the approver confirms the content of the electronic file and determines to approve the electronic file, the printing on the application 300 is executed.

Upon receiving the print command, the CPU 250 activates the printer driver 310 stored in the HDD 230, and instructs the CRT controller 221 to display the user interface unit 3101 for the approver on the CRT display 220 (step S1601).

Next, the approver inputs setting information into a setting item input section of the user interface unit 3101, and the CPU 250 begins a process of step S1602 when the approver presses the print execution button (Yes in step S1602).

Particularly, after the user interface unit 3101 for the approver is displayed, the approver clicks a tab of the approval key creation interface 3101b, thereby displaying the approval key creation interface 3101b. Next, the approver checks the approval check box 3101-5 and selects a desired encryption algorithm, for example, DES, using the encryption algorithm selection button 3101-6. The approver inputs the password in the password entry box 3101-7. Hereupon, the message of "Not Create Approval Key" displayed in the confirmation section 3101-7b illustrated in the FIG. 5b is changed to "Create Approval Key", thereby completing preparations for the approval key creation. When the approver presses the print execution button 3101-14, the creation of the approval key file begins.

In step S1602, upon receiving the print execution command, the CPU 250 instructs the printer GDI driver 3102 to convert the electronic file into the print data based on the setting information input to the user interface unit 3101 for the approver.

Subsequently, in step S1603, the CPU 250 instructs the approval information extraction unit 3103 to extract the electronic file information 340 to be used as electronic file approval information from the print data created by the printer GDI driver 3102. Upon receiving the instruction, the approval information extraction unit 3103 creates the electronic file information 340.

Moreover, the CPU 250 determines whether or not to create the approval key file 330 based on the setting information input to the user interface unit 3101 for the approver (step S1604). Where the CPU 250 determines to create the approval key file 330 (Yes in step S1604), the CPU 250 instructs the file creator distinction unit 3109 to distinguish the electronic file creator (step S1605).

Upon receiving the instruction from the CPU 250 to distinguish the electronic file creator, the file creator distinction unit 3109 compares the file creator information included in the electronic file information 340 and the login name of a current user using the personal computer 120. Where the name of the electronic file creator and the login name of the current user of the personal computer 120 are determined to be matched (Yes in step S1605), the CPU 250 instructs to finish the process.

On the other hand, where the name of the electronic file creator and the login name of the current user of the personal computer are determined not to be matched (No in step S1605), the CPU 250 instructs the approval key creation unit 3104 to create the approval key file 330.

Upon receiving the instruction of creating the approval key file 330 from the UPC 250, the approval key creation unit 3104 creates the approval key file 330 based on the electronic file information 340 using the encrypted secret key algorithm such as DES selected by the approver (step S1606). Subsequently, the CPU 250 instructs the printer GDI driver 3102 to discard the print data (step S1607). Upon receiving the discard command of the print data from the CPU 250, the printer GDI driver 3102 discards the print data.

Therefore, when the approver approves the predetermined electronic file, the approval key file 330 is generated as the electronic file. On the other hand, where the CPU determines not to create the approval key file 330 based on the setting information input to the user interface unit 3101 (No in step S1604), that is, where the approver prints the electronic file being already approved without creating the approval key file, flow proceeds as substantially the same as the processes described above according to the second embodiment.

Therefore, in addition to the advantages of the first and the second embodiments described above, the names of the predetermined electronic file creator and the approval key file creator are compared so as to determine a validity of the approver in the process of approving the predetermined electronic file, thereby reducing (if not eliminating) an occurrence of an unauthorized approval process having the same electronic file creator and the electronic file approver according to the third embodiment of the present invention described above.

A Fourth Embodiment

An electronic file approval management system according to a fourth embodiment of the present invention includes an information terminal device for an approver including a hash key process unit generating hash data based on print data and an approval key creation unit creating an approval key file based on the hash data and electronic file information, and also includes the information terminal device for the approver or an information terminal device for an electronic file creator including the hash key process unit and an approval key authentication unit comparing the hash data and the hash data included in the approval key file.

The information terminal device for the approver and the information terminal device for the electric file creator according to the fourth embodiment are respectively substantially the same as the personal computer 120 serving as the information terminal device for the approver and the personal computer 130 serving as the information terminal device for the electronic file creator according to the second embodiment. Only components and/or configurations of the information terminal devices 120 and 130 of the fourth embodiment that differ from those of the second embodiment will be described, and like components will be given the same reference numerals as above and description thereof will be omitted.

Figure 17:
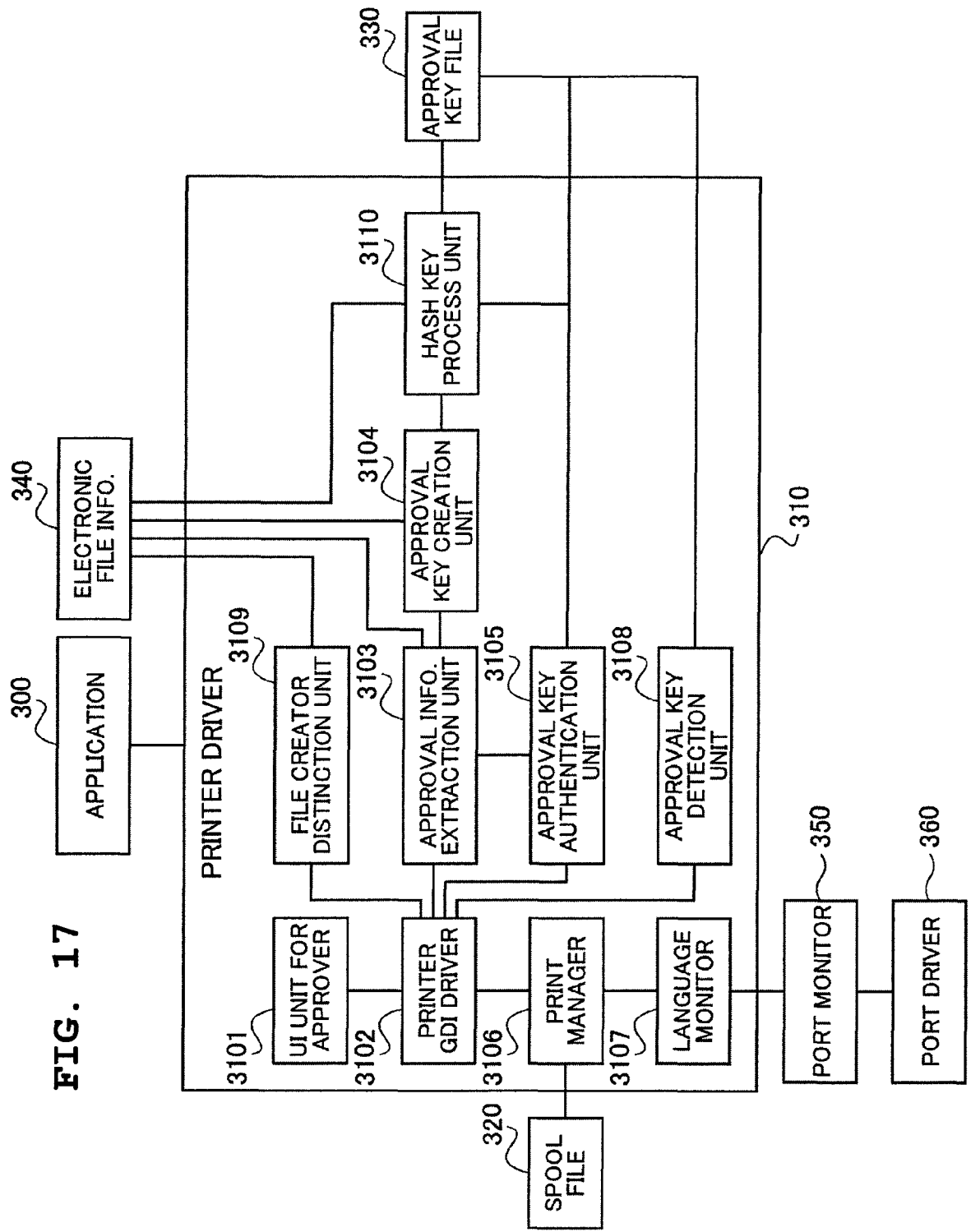
FIG. 17 is a block diagram illustrating modules of a personal computer used by an approver according to a fourth embodiment of the present invention.

Referring to FIG. 17, modules of the personal computer 120 for the approver according to the fourth embodiment are illustrated. The personal computer 120 according to the fourth embodiment includes the modules that are included in the personal computer 120 according the third embodiment, and the printer driver 310 includes a hash key process unit 3110 in addition to the elements included in the third embodiment.

Figure 18:
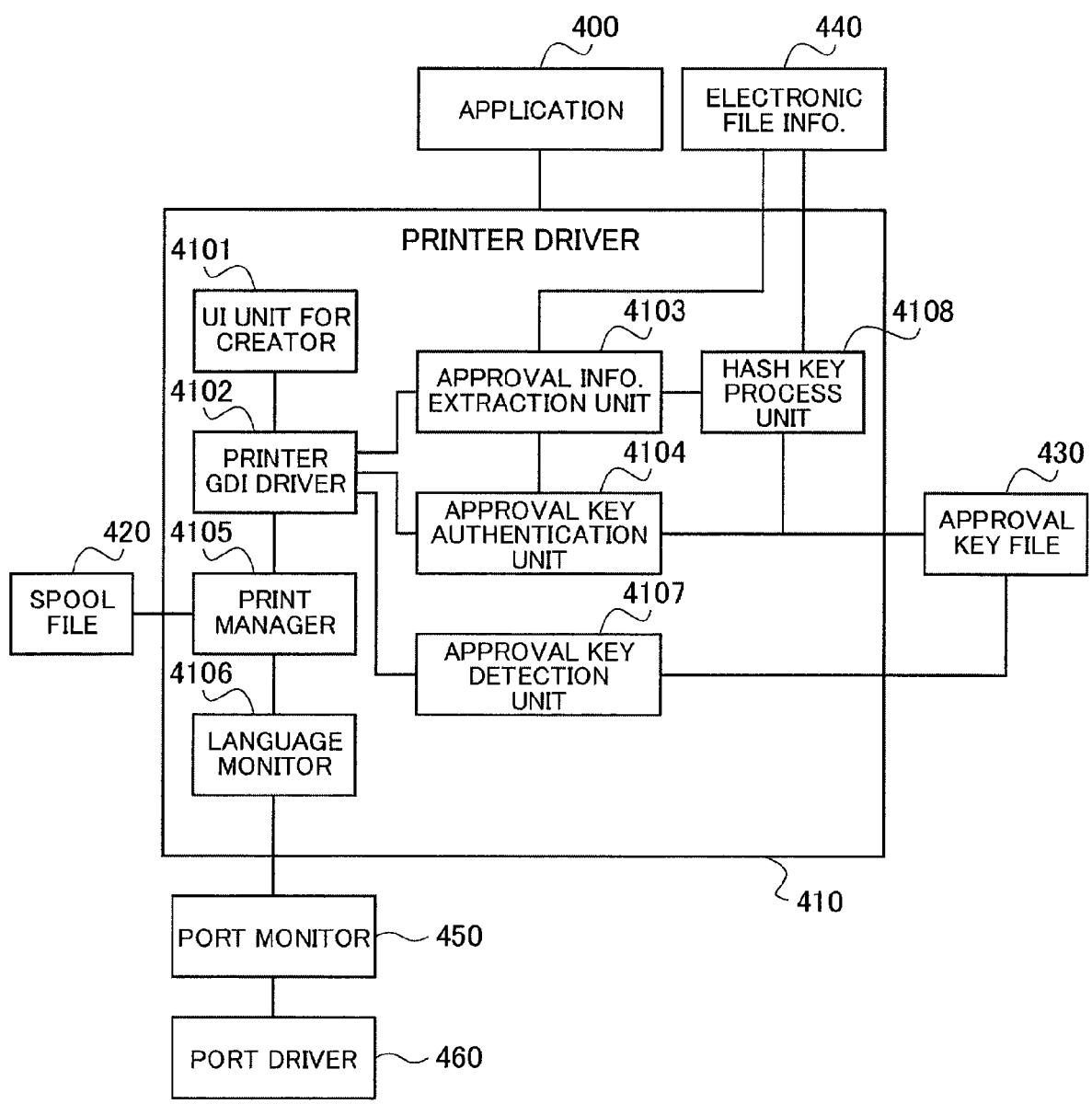
FIG. 18 is a block diagram illustrating modules of another personal computer used by a creator according to the fourth embodiment of the present invention.

Referring to FIG. 18, modules of the personal computer 130 for the creator according to the fourth embodiment are illustrated. The personal computer 130 according to the fourth embodiment includes the modules that are included in the personal computer 130 according the second embodiment, and the printer driver 410 includes a hash key process unit 4108 in addition to the elements included in the second embodiment.

Each of the hash key process units 3110 and 4108 serving as a program generates and analyzes the hash data based on the print data. Each of the hash key process units 3110 and 4108 generates the hash data by hashing the print data by a general hash algorithm such as Secure Hash Algorithm-1 (SHA-1), and analyzes the generated hash data.

The approval key creation unit 3104 serving as a program creates the approval key file 330 based on the electronic file information 340 and the hash data generated by the hash key process unit 3110, and encrypts the approval key file 330 by a general encrypted secret key algorithm such as DES.

The approval key authentication units 3105 and 4104 serving as programs decrypt the approval key files 330 and 430 respectively, and execute data collation of the electronic file information 340 and 440 created by the approval information extraction units 3103 and 4103, respectively. Moreover, the approval key authentication units 3105 and 4104 determine whether or not to have the restricted print based on the analysis of the hash data by the hash key process units 3110 and 4108, respectively.

Figure 19:
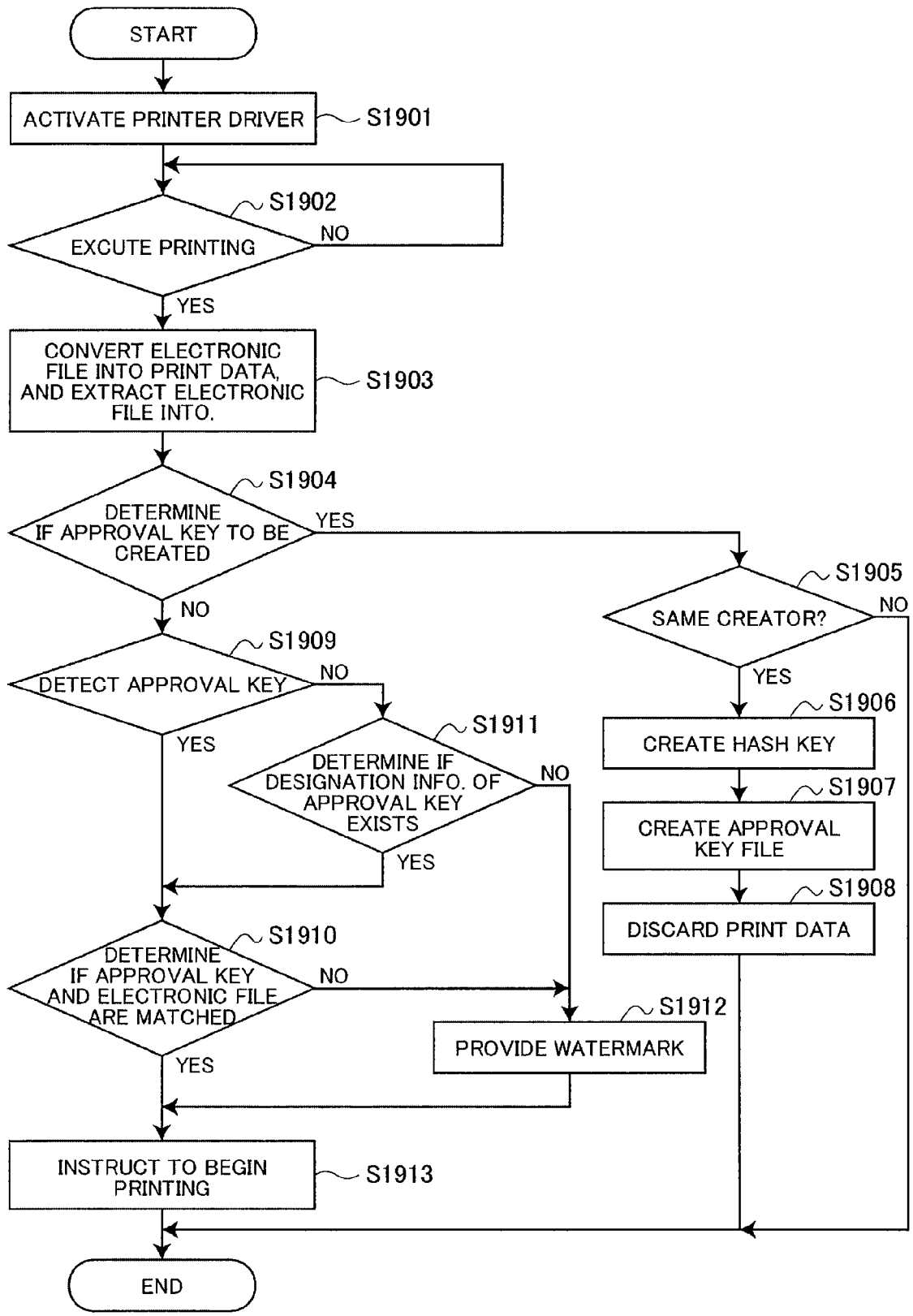
FIG. 19 is a flowchart illustrating a series of an example procedure for creating an approval key file by approving an electronic file the approver according to the fourth embodiment of the present invention.

Referring to a flowchart of FIG. 19, a series of an example procedure for creating the approval key file by approving the electronic file by the approver is illustrated. After the creator creates the electronic file using the application 400 of the personal computer 130 and stores the created electronic file in a predetermined location of the file server 140 through the network interface card 240, the approver activates the application 300 and opens the electronic file created by the creator, thereby beginning of the series of the processes. When the approver confirms the content of the electronic file and determines to approve the electronic file, the printing on the application 300 is executed.

Upon receiving the print command, the CPU 250 activates the printer driver 310 stored in the HDD 230, and instructs the CRT controller 221 to display the user interface unit 3101 for the approver on the CRT display 220 (step S1901).

Next, the approver inputs setting information into a setting item input section of the user interface unit 3101, and the CPU 250 begins a process of step S1902 when the approver presses the print execution button (Yes in step S1902).

Particularly, after the user interface unit 3101 for the approver is displayed, the approver clicks a tab of the approval key creation interface 3101b, thereby displaying the approval key creation interface 3101b. Next, the approver checks the approval check box 3101-5 and selects a desired encryption algorithm, for example, DES, using the encryption algorithm selection button 3101-6. The approver inputs the password in the password entry box 3101-7. Hereupon, the message of "Not Create Approval Key" displayed in the confirmation section 3101-7b illustrated in the FIG. 5b is changed to "Create Approval Key", thereby completing preparations for the approval key creation. When the approver presses the print execution button 3101-14, the creation of the approval key file begins.

In step S1902, when the approver presses the print execution button 3101-14, the CPU 250 instructs the printer GDI driver 3102 to convert the electronic file into the print data based on the setting information input to the user interface unit 3101.

Subsequently, in step S1903, the CPU 250 instructs the approval information extraction unit 3103 to extract the electronic file information 340 to be used as electronic file approval information from the print data created by the printer GDI driver 3102. Upon receiving the instruction, the approval information extraction unit 3103 creates the electronic file information 340.

Moreover, the CPU 250 determines whether or not to create the approval key file 330 based on the setting information input to the user interface unit 3101 (step S1904). Where the CPU 250 determines to create the approval key file 330 (Yes in step S1904), the CPU 250 instructs the file creator distinction unit 3109 to distinguish the electronic file creator (step S1905).

Upon receiving the instruction from the CPU 250 to distinguish the electronic file creator, the file creator distinction unit 3109 compares the file creator information included in the electronic file information 340 and the login name of a current user using the personal computer 120. Where the name of the electronic file creator and the login name of the current user of the personal computer 120 are determined to be matched (Yes in step S1905), the CPU 250 instructs to finish the process.

On the other hand, where the name of the electronic file creator and the login name of the current user of the personal computer 120 are determined not to be matched (No in step S1905), the CPU 250 instructs the hash key process unit 3110 to generate the hash data (hash key) hashed by the general hash algorithm such as SHA-1 based on the print data.

Upon receiving the instruction from the CPU 250, the hash key process unit 3110 generates the hash data using the hash algorithm such as SHA-1 based on the print data (step S1906).

Next, the approval key creation unit 3104 instructed by the CPU 250 for creation of the approval key file 330 creates the approval key file 330 using the hash data generated by the hash key process unit 3110 and the encrypted secret key algorithm such as DES selected by approver based on the electronic file information 340 (step S1907). The CPU 250 instructs the printer GDI driver 3102 to discard the print data (step S1908). Upon receiving the discard command of the print data from the CPU 250, the printer GDI driver 3102 discards the print data.

As described above, where the approver approves the predetermined electronic file, the approval key file 330 is generated as the electronic file. On the other hand, where the CPU 250 determines not to create the approval key file 330 based on the setting information input to the user interface unit 3101 (No in step S1904), that is, where the approver prints the electronic file being already approved without creating the approval key file, flow proceeds as substantially the same as processes described above according to the third embodiment except for an authentication process of the approval key file 330 by the approval key authentication unit 3105.

The approval key authentication unit 3105 analyzes the approval key file 330 based on designation information of the approval key file 330, and collates with the electronic file information 340 created in step S1903. Simultaneously, the CPU 250 instructs the hash key process unit 3110 to generate the hash data (hash key) hashed by the general hash algorithm such as SHA-1 based on the print data. Upon receiving the instruction from the CPU 250, the hash key process unit 3110 generates the hash data using the hash algorithm such as SHA-1 based on the print data. The CPU 250 instructs the approval key authentication unit 3105 to compare and analyze the hash data generated by the hash key process unit 3110 and the hash data include in the approval key file.

Upon receiving the instruction from the CPU 250, the approval key authentication unit 3105 compares and analyzes the hash data generated by the hash key process unit 3110 and the hash data include in the approval key file, and determines whether or not the hash data generated by the hash key process unit 3110 and the hash data include in the approval key file are matched. When the hash data generated by the hash key process unit 3110 and the hash data include in the approval key file are determined to be matched (Yes in step S1910), the print manager 3106 executes the print process (step S1913).

Where the approval key file 330 and the electronic file information 340 are determined not be matched (No in step S1910), the CPU 250 instructs the printer GDI driver 3102 to provide the watermark indicating the electronic file being disapproved to the print data (step S1912). Subsequently, the CPU 250 provides the print start command to the print manager 3106, and the print manager 3106 begins the print process (step S1913). Upon receiving the print start command from the CPU 250, the print manager 3106 creates the spool file 320 and transmits to the network printer 110 through the language monitor 3107, the port monitor 350 and the port driver 360. The print manager 3106 deletes the electronic file information 340 and finishes the series of processes after transmitting the spool file 320 to the network printer 110. The network printer 110 receives the spool file 320 and prints the information of the spool file 320 with the watermark on the recording medium as illustrated in FIG. 8.

Figure 20:
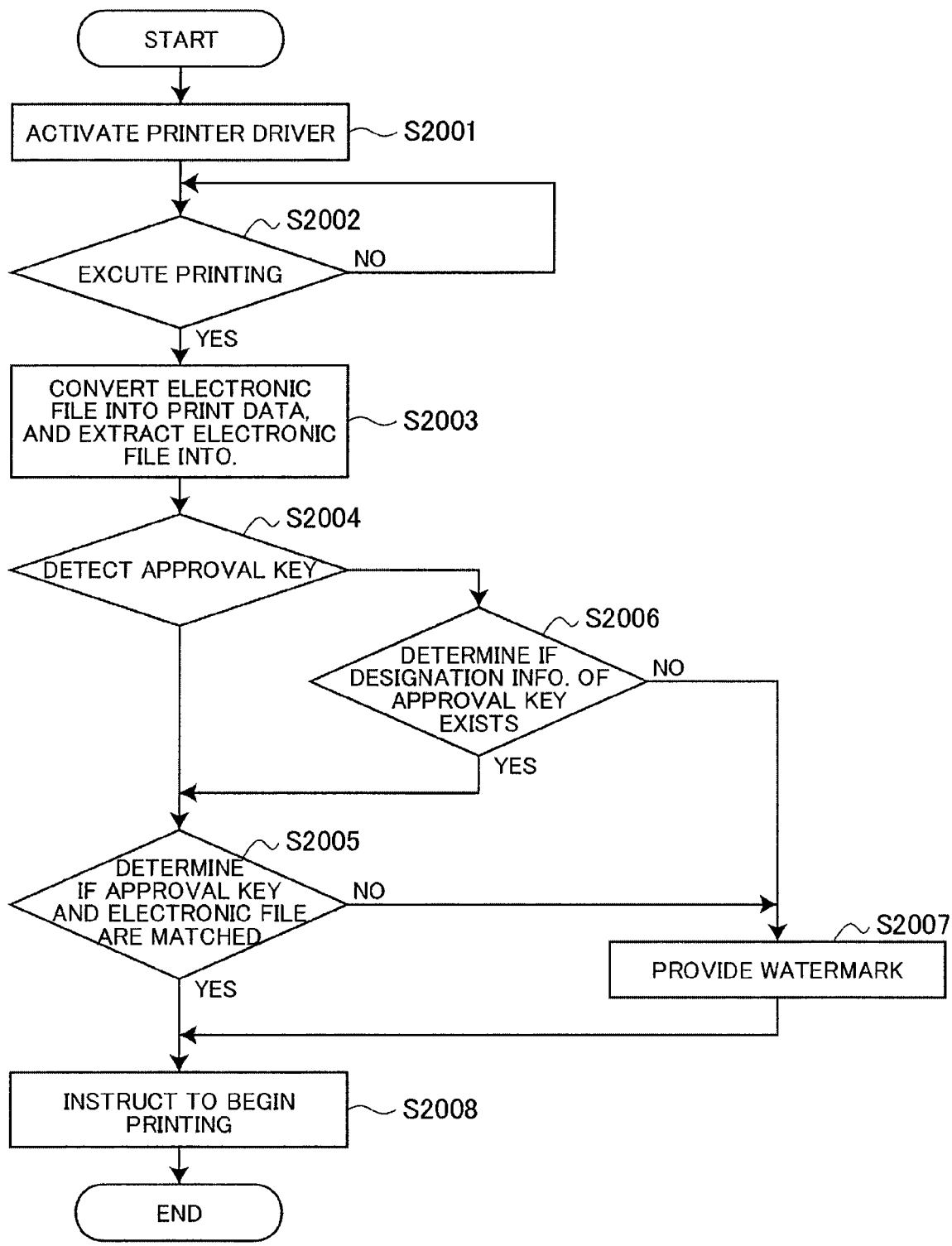
FIG. 20 is a flowchart illustrating a series of an example procedure when the creator prints the electronic file approved by the approver according to the fourth embodiment of the present invention.

Referring to a flowchart of FIG. 20, a series of example processes when the creator prints the electronic file approved by the approver is described. The series of the example processes of printing the approved electronic file by the creator according to the fourth embodiment is substantially the same as the flowchart of FIG. 14 according to the second embodiment described above. However, an authentication process by the approval key authentication unit 4104 differs from that of the second embodiment as similar to the print process by the approver described with reference to FIG. 19.

The approval key authentication unit 4104 analyzes the approval key file 430 based on the designation information of the approval key file 430, and collates with the electronic file information 440 created in step S2003. Simultaneously, the CPU 250 instructs the hash key process unit 4108 to generate the hash data (hash key) hashed by the general hash algorithm such as SHA-1 based on the print data. Upon receiving the instruction from the CPU 250, the hash key process unit 4108 generates the hash data using the hash algorithm such as SHA-1 based on the print data. The CPU 250 instructs the approval key authentication unit 4104 to compare and analyze the hash data generated by the hash key process unit 4108 and the hash data include in the approval key file.

Upon receiving the instruction from the CPU 250, the approval key authentication unit 4108 compares and analyzes the hash data generated by the hash key process unit 4108 and the hash data include in the approval key file 430, and determines whether or not the hash data generated by the hash key process unit 4108 and the hash data include in the approval key file 430 are matched. Where the hash data generated by the hash key process unit 4108 and the hash data include in the approval key file 430 are determined to be matched (Yes in step S2005), the normal print process is executed (step S2008).

Where approval key file 430 and the electronic file information 440 are determined not to be matched (No in step S2005), the CPU 250 instructs the printer GDI driver 4102 to provide the watermark indicating the electronic file being disapproved to the print data (step S2007). Subsequently, the CPU 250 provides the print start command to the print manager 4105, and the print manager 4105 begins the print process (step S2008). Upon receiving the print start command from the CPU 250, the print manager 4105 creates the spool file 420 and transmits to the network printer 110 through the language monitor 4106, the port monitor 450 and the port driver 460. The print manager 4105 deletes the electronic file information 440 and finishes the series of processes after transmitting the spool file 420 to the network printer 110. The network printer 110 receives the spool file 420 and prints the information of the spool file 420 with the watermark on the recording medium as illustrated in FIG. 8.

Therefore, in addition to the advantages of the first, second and third embodiments described above, the hash data of the electronic file in the course of creating the approval key file and the hash data of the electronic file in the course of print execution are compared in the process of approving the predetermined electronic file, thereby increasing security level of the approval process by invalidating the electronic file edited by the creator after the electronic file is approved by the approver according to the fourth embodiment described above.

The present invention has been described above with regard to particular embodiments, but the invention is not limited thereby and it must be understood that the invention encompasses all modifications possible not departing from the scope of the invention. For example, the embodiments of the present invention may be applied to a printer driver for use in a printer, a facsimile, a multifunction peripheral (MFP), a photocopier and scanner, etc. having a connection format such as a universal serial bus (USB) and a parallel in addition to the network.

As can be appreciated by those skilled in the art, numerous additional modifications and variation of the present invention are possible in light of the above-described teachings. It is therefore to be understood that, within the scope of the appended claims, the disclosure of this patent specification may be practiced otherwise than as specifically described herein.

What is claimed is:

1. An electronic file approval management system comprising an information terminal device for an electronic file creator creating an electronic file and an information terminal device for an approver approving the electronic file;
    the information terminal device for the approver comprising:
        an electronic information transmission reception unit for the approver storing and retrieving electronic information with the information terminal device for the electronic file creator;
        an input unit for approving the electronic file being input an approval result by a user of the electronic file received by the electronic information transmission reception unit;
        a first print data conversion unit converting the electronic file into first print data from the approval result input to the input unit for approving the electronic file, the print data having a data structure comprising information to be printed, attribute information and approval information;
        a first approval information extraction unit extracting first approval information of the electronic file from the first print data converted by the first print data conversion unit; and
        an approval key creation unit creating an approval key from the first approval information extracted by the first approval information extraction unit;
    the information terminal device for the electronic file creator comprising:
        an electronic file creation unit creating the electronic file;
        an electronic information transmission reception unit for the electronic file creator storing and retrieving the electronic information with the information terminal device for the approver;
        a second print data conversion unit converting the electronic file into second print data;
        a second approval information extraction unit extracting second approval information of the electronic file from the second print data converted by the second print data conversion unit; and
        an approval key authentication unit determining whether or not to make an approval from collation of the second approval information extracted by the second approval information extraction unit and the approval key transmitted from the electronic information transmission reception unit for the approver.

2. The electronic file approval management system according to claim 1, wherein the information terminal device for the electronic file creator comprises an approval key detection unit obtaining storage location information of the electronic file from the second print data including the storage location information and determining whether or not the approval key exists in a storage location of the electronic file from the storage location information.

3. The electronic file approval management system according to claim 1, wherein the information terminal device for an approver comprises a file creator distinction unit distinguishing the creator of the electronic file.

4. The electronic file approving management system according to claim 1, wherein the information terminal device for the approver further comprises a first hash key process unit generating first hash data from the first print data,
wherein the approval key creation unit creates an approval key from the first approval information extracted by the first approval information extraction unit and from the first hash data generated by the first hash key process unit,
wherein the information terminal device for the electronic file creator further comprises a second hash key process unit generating second hash data from the second print data, and
wherein the approval key authentication unit determines whether or not to make an approval from collation of the second hash data generated by the second hash key process unit and the first hash data included in the approval key created by the approval key creation unit of the information terminal device for the approver.

5. The electronic file approval management system according to claim 1, wherein the information terminal device for the electronic file creator transmits the print data from the electronic file to a printer.

6. The electronic file approval management system according to claim 1,
wherein the information terminal device for the approver approving the electronic file further comprises a user interface unit for the approver, and the user interface unit for the approver indicates an approval key creation tab and an approval key reading tab, and
wherein the information terminal device for the electronic file creator creating the electronic file further comprises a user interface unit for the creator, and the user interface unit for the creator indicates the approval key creation tab and the approval key reading tab.

7. The electronic file approval management system according to claim 1, wherein the approval key authentication unit controls to print a watermark indicating the electronic file being disapproved to a print material in a case where designation information of approval key does not exist or approval key are not matched with the electronic file.

8. An information terminal device for an approver comprising:
an electronic information transmission reception unit for the approver storing and retrieving electronic information with an electronic information device for an electronic file creator;
an input unit for approving an electronic file being input an approval result of the electronic file received by the electronic information transmission reception unit for the approver;
a print data conversion unit converting the electronic file into print data from the approval result input to the input unit for approving the electronic file, the print data having a data structure comprising information to be printed, attribute information and approval information;
an approval information extraction unit extracting approval information of the electronic file from the print data converted by the print data conversion unit; and
an approval key creation unit creating an approval key from the approval information extracted by the approval information extraction unit.

9. An information terminal device for an electronic file creator comprising:
an electronic file creation unit creating an electronic file;
a print data conversion unit converting the electronic file into print data, the print data having a data structure comprising information to be printed, attribute information and approval information;
an approval information extraction unit extracting approval information of the electronic file from the print data converted by the print data conversion unit;
an electronic information transmission reception unit for the electronic file creator storing and retrieving electronic information including an approval key with an information terminal device for an approver; and
an approval key authentication unit determining whether or not to make an approval from collation of the approval information extracted by the approval information extraction unit and the approval key received by the electronic information transmission reception unit for the electronic file creator.

10. A method of managing an electronic file approval applied to an electronic file approval management system comprising an information terminal device for an electronic file creator creating an electronic file and an information terminal device for an approver approving the electronic file, the method comprising the steps of:
creating the electronic file by an electronic file creation unit;
transmitting the electronic file created by the electronic file creation unit to the information terminal device for the approver;
receiving the electronic file transmitted by the transmitting step of transmitting the electronic file;
inputting an approval result of the electronic file received by the receiving step into an input unit for approving the electronic file;
converting the electronic file into first print data from the approval result input to the input unit for the approving the electronic file, the first print data having a data structure comprising information to be printed, attribute information and approval information;
extracting first approval information of the electronic file from the first print data;
creating an approval key from the first approval information;
transmitting the approval key to the information terminal device for the electronic file creator;
receiving the approval key transmitted by the transmitting step of transmitting the approval key;
converting the electronic file into second print data having a data structure comprising information to be printed, attribute information and approval information;
extracting second approval information of the electronic file from the second print data; and
determining whether or not to make an approval from collation of the second approval information and the approval key received by the receiving step of receiving the approval key.

11. The method of managing an electronic file approval according to claim 10 is applied to an electronic file approval management system comprising an information terminal device for an electronic file creator transmitting the print data from the electronic file to a printer and an information terminal device for an approver approving the electronic file.

* * * * *